United States Patent
Riemer et al.

(10) Patent No.: US 12,489,302 B2
(45) Date of Patent: Dec. 2, 2025

(54) SYSTEMS AND METHODS OF CHARGING PLAYBACK DEVICE BATTERIES

(71) Applicant: Sonos, Inc., Goleta, CA (US)

(72) Inventors: Joern Riemer, Trabuco Cayon, CA (US); James Nesfield, Edinburgh (GB); Matthew Benatan, Stockport (GB)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/876,876

(22) PCT Filed: Jun. 21, 2023

(86) PCT No.: PCT/US2023/068790
§ 371 (c)(1),
(2) Date: Dec. 19, 2024

(87) PCT Pub. No.: WO2023/250359
PCT Pub. Date: Dec. 28, 2023

(65) Prior Publication Data
US 2025/0273969 A1    Aug. 28, 2025

Related U.S. Application Data

(60) Provisional application No. 63/367,006, filed on Jun. 24, 2022.

(51) Int. Cl.
*H02J 7/00*    (2006.01)
*H04R 3/12*    (2006.01)
(Continued)

(52) U.S. Cl.
CPC ........ *H02J 7/0013* (2013.01); *H02J 7/00034* (2020.01); *H02J 7/0048* (2020.01);
(Continued)

(58) Field of Classification Search
CPC .... H02J 7/0013; H02J 7/00034; H02J 7/0048; H02J 7/005; H02J 7/0071; H02J 7/00712; H04R 3/12
(Continued)

(56) References Cited

U.S. PATENT DOCUMENTS 5,956,330 A * 9/1999 Kerns .................. H04W 16/14
370/336
8,305,428 B2 * 11/2012 Hu .......................... H04R 5/00
348/42
(Continued)

FOREIGN PATENT DOCUMENTS

EP    3188448 A1    7/2017
WO    2022047503 A1    3/2022

OTHER PUBLICATIONS

International Search Report and Written Opinion mailed Nov. 6, 2023; International Application No. PCT/US2023/068790; 10 pages.

*Primary Examiner* — John T Trischler
(74) *Attorney, Agent, or Firm* — Fortem IP LLP

(57) ABSTRACT

Disclosed herein are systems and methods for charging batteries of audio playback devices. An example method performed by a media playback system includes receiving power from a first power source to charge a first power storage of a first playback device according to a first charging scheme, and receiving power from a second power source to charge a second power storage of a second playback device according to a second charging scheme. The system receives an instruction to form a group for synchronous audio playback, and obtains one or more power parameters associated with the first playback device and/or the second playback device. After receiving the instruction to form the group, the system modifies the first charging scheme based on the one or more power parameters, and (Continued)

then receives power from the first power source to charge the first power storage according to the modified first charging scheme.

45 Claims, 27 Drawing Sheets

(51) Int. Cl.
| | |
|---|---|
| G06F 3/16 | (2006.01) |
| H03F 3/68 | (2006.01) |
| H04R 5/04 | (2006.01) |

(52) U.S. Cl.
CPC ............ *H02J 7/005* (2020.01); *H02J 7/0071* (2020.01); *H02J 7/00712* (2020.01); *H04R 3/12* (2013.01); *G06F 3/162* (2013.01); *G06F 3/165* (2013.01); *H03F 3/68* (2013.01); *H04R 5/04* (2013.01); *H04R 2227/005* (2013.01); *H04R 2420/07* (2013.01)

(58) Field of Classification Search
USPC .................................................. 320/107, 125
See application file for complete search history.

(56) References Cited

U.S. PATENT DOCUMENTS

| | | | | |
|---|---|---|---|---|
| 8,744,087 | B2* | 6/2014 | Bodley | H04N 7/15 |
| | | | | 455/556.1 |
| 9,271,063 | B2* | 2/2016 | Saideh | H04R 1/1033 |
| 9,544,701 | B1* | 1/2017 | Rappoport | H04H 20/18 |
| 9,577,710 | B2* | 2/2017 | Greuet | H04R 1/403 |
| 9,706,307 | B2* | 7/2017 | Yoon | H04R 3/12 |
| 9,749,761 | B2* | 8/2017 | Rappoport | H04H 20/18 |
| 9,965,242 | B2* | 5/2018 | Gossain | H04W 52/0251 |
| 9,992,574 | B2* | 6/2018 | Esses | H04R 3/12 |
| 10,001,965 | B1* | 6/2018 | Lang | H04R 27/00 |
| 10,114,605 | B2* | 10/2018 | Gossain | H04L 65/762 |
| 10,142,750 | B2* | 11/2018 | Hariharan | H04W 84/20 |
| 10,324,685 | B2* | 6/2019 | Gossain | H04W 52/46 |
| 10,445,058 | B2* | 10/2019 | Gossain | G06F 3/165 |
| 10,489,108 | B2* | 11/2019 | Lang | H04L 41/0893 |
| 10,681,488 | B1* | 6/2020 | Liang | H04S 7/301 |
| 10,687,135 | B1* | 6/2020 | Palupunoori | H01M 10/623 |
| 10,735,878 | B2* | 8/2020 | Rappoport | H04H 20/18 |
| 10,753,791 | B2* | 8/2020 | Bahadirlar | G01B 9/02003 |
| 10,771,908 | B2* | 9/2020 | Hariharan | H04R 1/1041 |
| 10,846,049 | B2* | 11/2020 | Gossain | H04L 45/22 |
| 10,911,515 | B2* | 2/2021 | Biasi | G16H 40/20 |
| 10,911,859 | B2* | 2/2021 | Palupunoori | H01M 10/623 |
| 10,976,992 | B2* | 4/2021 | Lang | H04R 5/04 |
| 11,297,453 | B2* | 4/2022 | Hariharan | H04R 29/001 |
| 11,424,029 | B2* | 8/2022 | Biasi | G16H 40/20 |
| 11,431,185 | B1* | 8/2022 | Feng | H02J 7/007 |
| 11,507,343 | B2* | 11/2022 | Gossain | H04L 65/762 |
| 11,523,206 | B2* | 12/2022 | Lehnert | H04R 5/033 |
| 11,528,570 | B2* | 12/2022 | Rappoport | H04R 27/00 |
| 11,791,646 | B1* | 10/2023 | Feng | H02J 7/0042 |
| | | | | 320/125 |
| 11,797,266 | B2* | 10/2023 | Gossain | G06F 3/165 |
| 11,812,228 | B2* | 11/2023 | Peters | H04N 21/439 |
| 11,816,389 | B2* | 11/2023 | Gossain | H04W 52/46 |
| 11,910,147 | B2* | 2/2024 | Lehnert | H04R 5/04 |
| 11,930,328 | B2* | 3/2024 | Lewis | H04R 27/00 |
| 12,015,900 | B2* | 6/2024 | Hariharan | H04W 4/80 |
| 12,164,362 | B2* | 12/2024 | Gossain | H04N 21/43615 |
| 12,167,216 | B2* | 12/2024 | Kallai | H04R 5/04 |
| 12,175,160 | B2* | 12/2024 | Gossain | G06F 3/165 |
| 12,177,635 | B2* | 12/2024 | Rappoport | H04H 20/18 |
| 12,200,454 | B2* | 1/2025 | Delhoume | H04R 3/12 |
| 12,250,261 | B2* | 3/2025 | Biasi | G16H 10/60 |
| 12,342,135 | B2* | 6/2025 | Lewis | H03G 5/005 |
| 2008/0284842 | A1* | 11/2008 | Hu | H04N 13/296 |
| | | | | 348/46 |
| 2010/0245585 | A1* | 9/2010 | Fisher | G06F 1/1686 |
| | | | | 348/240.99 |
| 2012/0014534 | A1* | 1/2012 | Bodley | H04N 7/15 |
| | | | | 320/108 |
| 2013/0101133 | A1* | 4/2013 | Yoon | H04R 3/12 |
| | | | | 381/77 |
| 2013/0103873 | A1* | 4/2013 | Reilly | G06F 1/1632 |
| | | | | 710/303 |
| 2013/0223631 | A1* | 8/2013 | Greuet | H04B 5/266 |
| | | | | 381/74 |
| 2013/0317753 | A1* | 11/2013 | Kamen | H04L 67/02 |
| | | | | 600/595 |
| 2015/0095679 | A1* | 4/2015 | Gossain | H04W 52/0251 |
| | | | | 713/323 |
| 2015/0154364 | A1* | 6/2015 | Biasi | G16H 40/20 |
| | | | | 709/223 |
| 2015/0195642 | A1* | 7/2015 | Saideh | H04R 1/1033 |
| | | | | 381/74 |
| 2015/0365763 | A1* | 12/2015 | Esses | H04R 3/12 |
| | | | | 381/80 |
| 2016/0124705 | A1* | 5/2016 | Gossain | H04W 52/0219 |
| | | | | 700/94 |
| 2017/0019742 | A1* | 1/2017 | Rappoport | H04H 20/18 |
| 2017/0127184 | A1* | 5/2017 | Mertel | H04R 27/00 |
| 2017/0134871 | A1* | 5/2017 | Rappoport | H04H 20/18 |
| 2017/0164089 | A1* | 6/2017 | Lee | H04R 1/1025 |
| 2017/0192739 | A1* | 7/2017 | Gossain | H04L 65/762 |
| 2017/0311105 | A1 | 10/2017 | Hariharan et al. | |
| 2018/0253278 | A1* | 9/2018 | Gossain | H04W 52/0219 |
| 2018/0357039 | A1* | 12/2018 | Lang | H04R 5/04 |
| 2019/0041258 | A1* | 2/2019 | Bahadirlar | G01B 9/02028 |
| 2019/0052984 | A1* | 2/2019 | Hariharan | H04W 84/20 |
| 2019/0073185 | A1* | 3/2019 | Gossain | H04L 65/762 |
| 2019/0222948 | A1* | 7/2019 | Rappoport | H04R 27/00 |
| 2019/0347065 | A1* | 11/2019 | Gossain | H04L 45/22 |
| 2020/0097250 | A1* | 3/2020 | Lang | H04L 41/0893 |
| 2020/0221211 | A1* | 7/2020 | Palupunoori | H04R 1/02 |
| 2020/0280787 | A1* | 9/2020 | Palupunoori | H04R 1/1025 |
| 2020/0336817 | A1* | 10/2020 | Lee | H04R 1/1025 |
| 2020/0367002 | A1* | 11/2020 | Rappoport | H04H 20/18 |
| 2020/0404439 | A1* | 12/2020 | Hariharan | H04W 84/20 |
| 2021/0037306 | A1 | 2/2021 | Lehnert et al. | |
| 2021/0216270 | A1* | 7/2021 | Gossain | H04L 45/22 |
| 2021/0382680 | A1* | 12/2021 | Gossain | G06F 3/165 |
| 2021/0409881 | A1* | 12/2021 | Peters | H04N 21/44231 |
| 2022/0038816 | A1* | 2/2022 | Gill | H04R 3/12 |
| 2022/0086554 | A1* | 3/2022 | Lee | H04R 1/1025 |
| 2022/0223283 | A1* | 7/2022 | Biasi | G16H 10/60 |
| 2022/0232333 | A1* | 7/2022 | Hariharan | H04W 84/20 |
| 2022/0286795 | A1* | 9/2022 | Lewis | H04R 5/04 |
| 2022/0358187 | A1* | 11/2022 | So | H04N 21/8106 |
| 2022/0358943 | A1* | 11/2022 | So | H04W 24/08 |
| 2023/0007397 | A1* | 1/2023 | Delhoume | H04R 29/002 |
| 2023/0022743 | A1* | 1/2023 | Gill | H04R 27/00 |
| 2023/0161549 | A1* | 5/2023 | Gossain | G06F 3/165 |
| | | | | 700/94 |
| 2023/0205486 | A1* | 6/2023 | D'Amato | G06F 3/165 |
| 2023/0224622 | A1* | 7/2023 | Lehnert | H04R 1/1025 |
| | | | | 381/74 |
| 2023/0259325 | A1* | 8/2023 | D'Amato | H04N 21/43615 |
| 2023/0259326 | A1* | 8/2023 | D'Amato | H04N 21/4436 |
| 2023/0283953 | A1* | 9/2023 | Kallai | H04R 27/00 |
| 2023/0288978 | A1* | 9/2023 | Gossain | G06F 1/3287 |
| 2023/0292068 | A1* | 9/2023 | Rappoport | H04H 20/18 |
| 2024/0073603 | A1* | 2/2024 | West | G06F 3/165 |
| 2024/0088693 | A1* | 3/2024 | Riemer | H02J 7/0071 |
| 2024/0094981 | A1* | 3/2024 | Gossain | H04L 65/762 |
| 2024/0111484 | A1* | 4/2024 | Peace | H04S 7/40 |
| 2024/0223978 | A1* | 7/2024 | Wilberding | H02J 50/00 |
| 2024/0251128 | A1* | 7/2024 | Wright | H04N 21/43076 |
| 2024/0348962 | A1* | 10/2024 | Lehnert | H04R 5/04 |
| 2024/0381043 | A1* | 11/2024 | Lewis | H03G 5/005 |
| 2025/0088815 | A1* | 3/2025 | Hariharan | H04R 29/001 |
| 2025/0157644 | A1* | 5/2025 | Biasi | A61B 5/11 |
| 2025/0193602 | A1* | 6/2025 | Xiang | H04R 1/1025 |
| 2025/0208691 | A1* | 6/2025 | Gossain | H04W 52/0277 |
| 2025/0217099 | A1* | 7/2025 | Gossain | G06F 3/165 |
| 2025/0227414 | A1* | 7/2025 | Delhoume | H04R 27/00 |

* cited by examiner

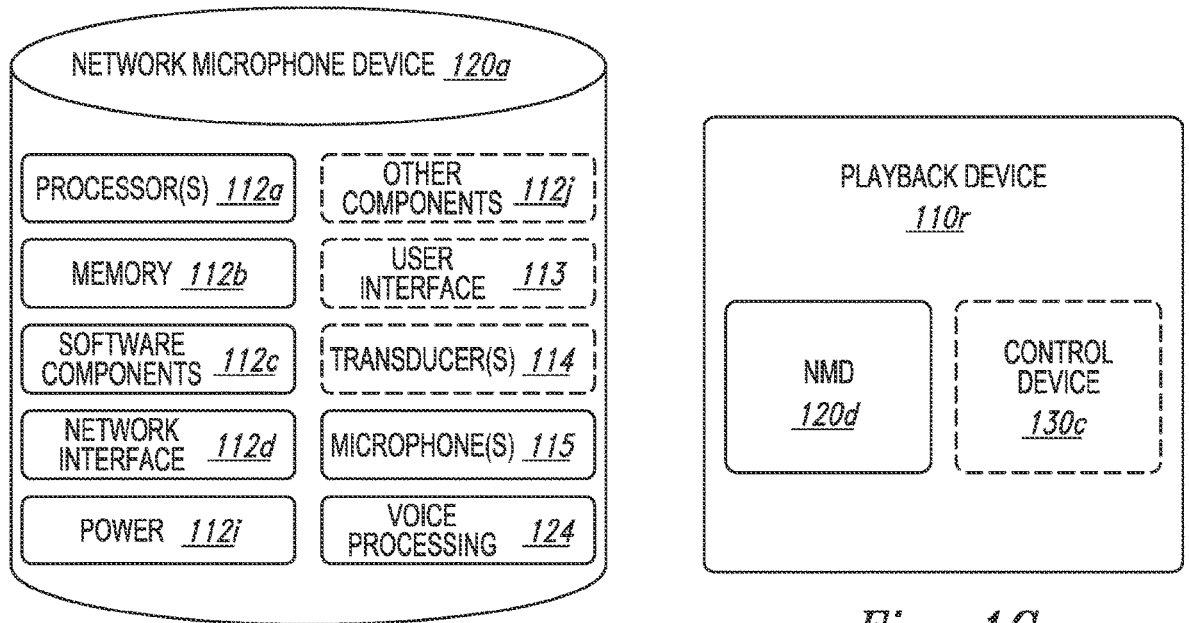
Fig. 1F
Fig. 1G
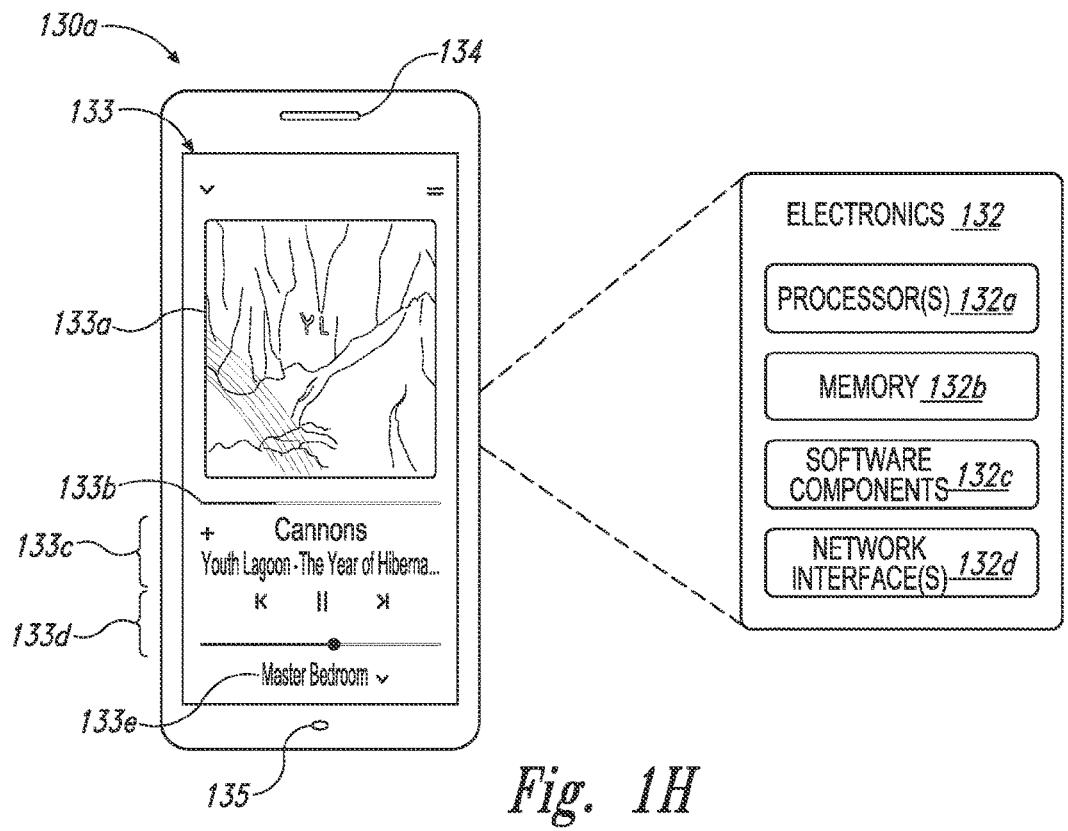
Fig. 1H

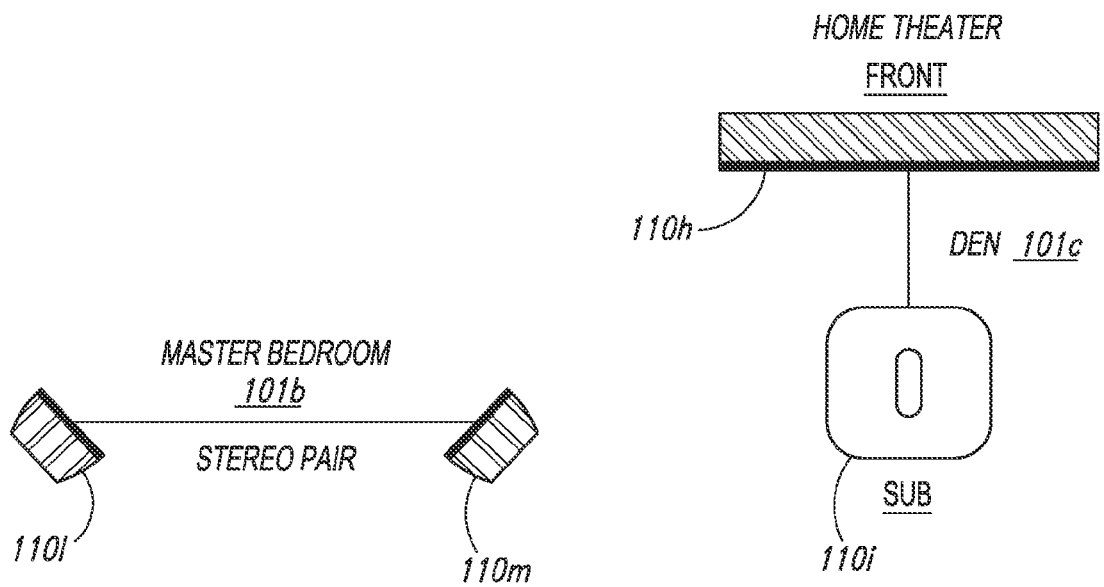
Fig. 1I
Fig. 1J
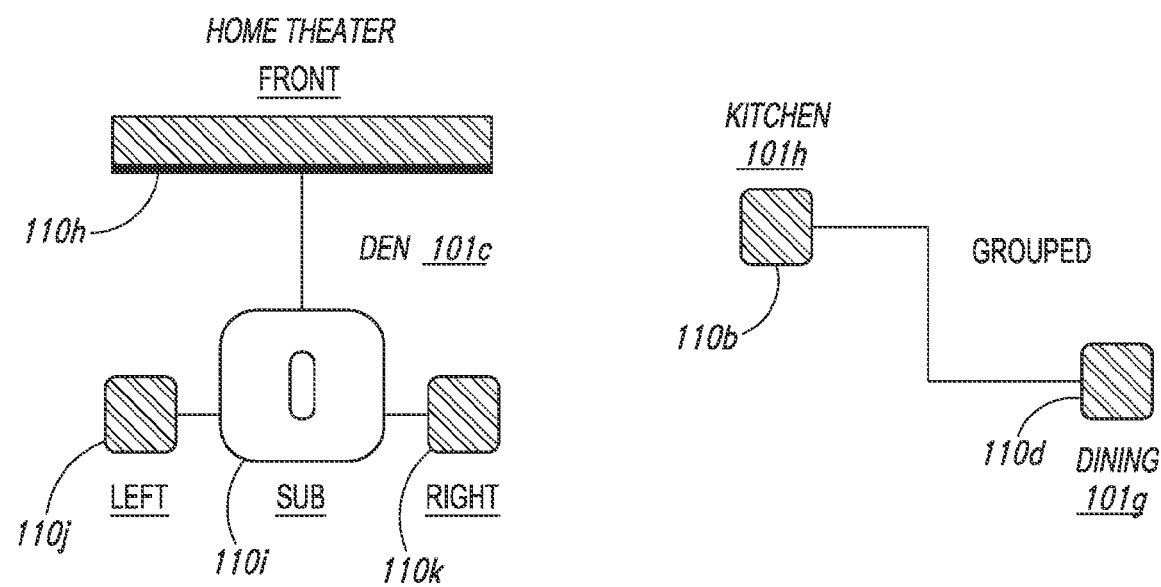
Fig. 1K
Fig. 1L

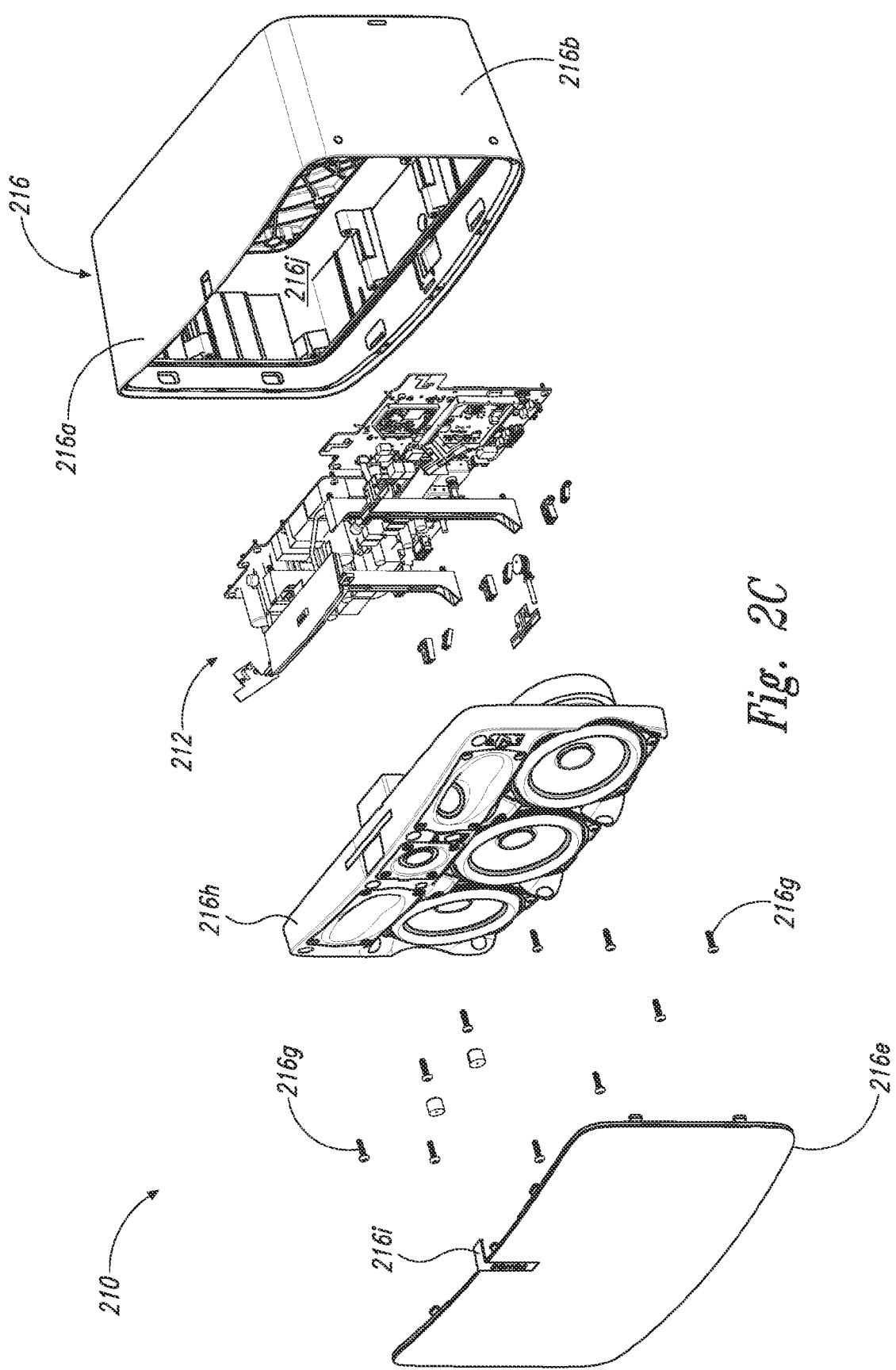

US 12,489,302 B2

SYSTEMS AND METHODS OF CHARGING PLAYBACK DEVICE BATTERIES

CROSS-REFERENCE TO RELATED APPLICATION

The present application is a 371 national phase application of International Patent Application No. PCT/US2023/068790, filed Jun. 21, 2023, which claims the benefit of priority to U.S. Provisional Application No. 63/367,006, filed Jun. 24, 2022, each of which is hereby incorporated by reference in its entirety.

FIELD OF THE DISCLOSURE

The present disclosure is related to consumer goods and, more particularly, to methods, systems, products, features, services, and other elements directed to media play back or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F shows a block diagram of a network microphone device.

FIG. 1G shows a block diagram of a playback device.

FIG. 1H shows a partially schematic diagram of a control device.

FIGS. 1I through 1L show schematic diagrams of corresponding media playback system zones.

FIG. 2C shows an exploded view of the playback device of FIG. 2A.

Figure 1A:
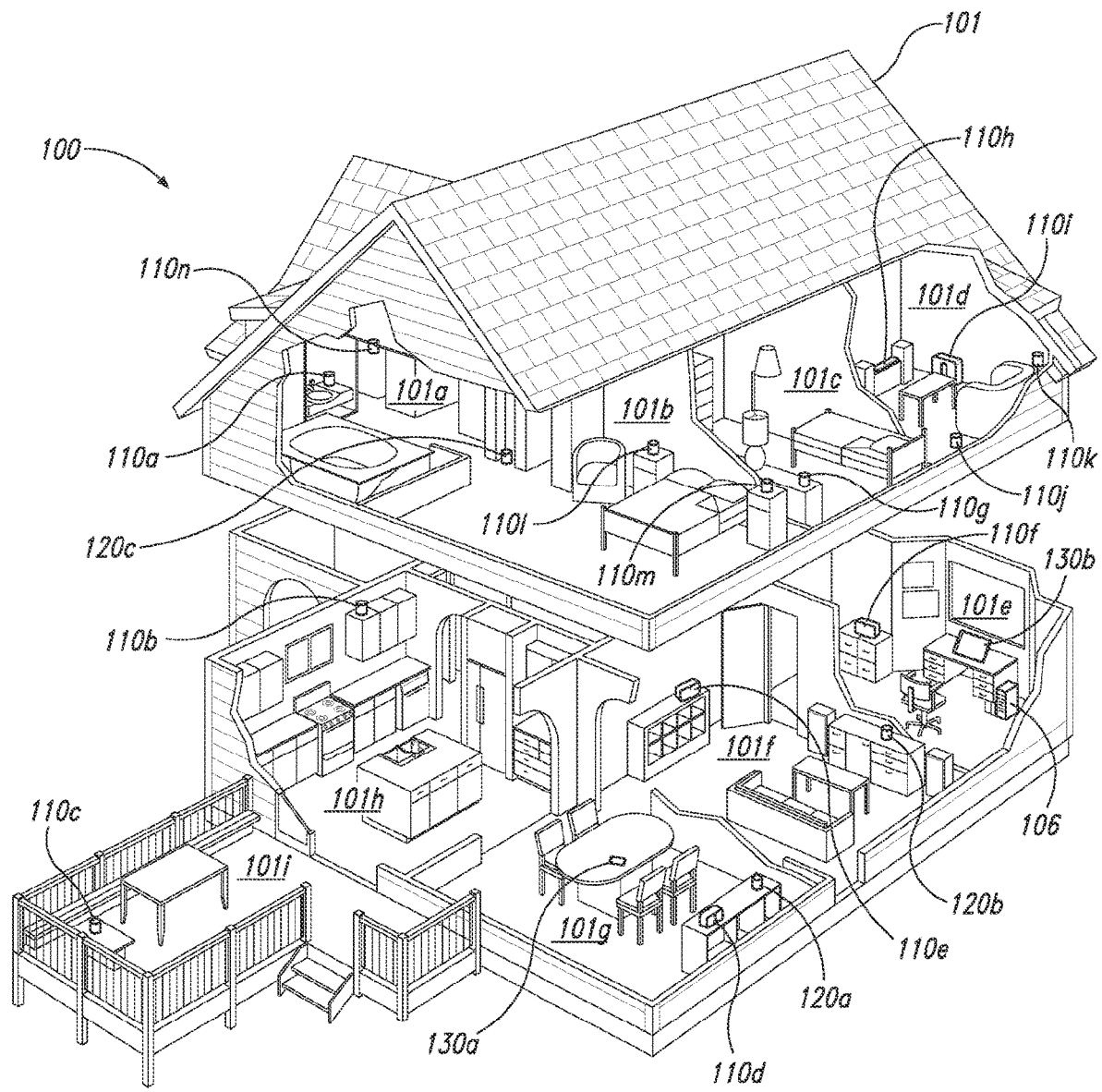
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Conventional media playback systems often include one or more playback devices, such as playback devices 110 (FIG. 1A), that include one or more rechargeable power stores or batteries. These rechargeable batteries allow users to use and re-use devices without the need to purchase new batteries to replace dead batteries. Moreover, these playback devices often use standardized charging ports and connector types (e.g., USB-A, USB-B, USB-C, APPLE LIGHTNING®, etc.) so that these devices can be charged and re-charged without specialized cabling and/or hardware, thereby enhancing the portability and the usability of these playback devices. In a conventional charging scheme, batteries of these playback devices are charged to a maximum capacity at or near the maximum charge rate allowable by the underlying hardware of the device and charging system, without regard for charging conditions or needs. Batteries made of certain chemistries (e.g., lithium ion, lithium polymer, nickel-metal hydride), however, may see their performance and capacities degrade faster based on charging conditions. For example, charging a lithium-ion battery to 100% is usually not advisable due to the currents and/or voltages needed to continue to charge the battery beyond a certain threshold (e.g., 95% capacity). Conversely, charging lithium-ion batteries using a low charging rate or "'C'-Rate" (e.g., less than or equal to 0.5 C, 0.7 C, etc.) rather than a high charging rate (e.g., greater than 1.5 C, 2 C, etc.) can significantly extend battery lifetime. In some cases, playback devices can be combined to create a group for synchronized playback of media content. However, these devices can each have different charge capacities, charge rates, discharge rates, playback responsibilities, and so on. Accordingly, these playback devices may run out of power or charge at different times during the synchronized playback, resulting in decreased performance of the overall media playback system, reduced user enjoyment, etc.

The disclosed playback devices, media playback systems, and/or methods can improve upon battery performance and battery lifetime by employing charging profiles or schemes based on device state, device operating parameters, device use patterns, device harvesting schedule/opportunities, etc. of one or more playback devices. Moreover, the playback devices can take advantage of playback device group dynamics to offload or share responsibilities amongst or between playback devices in the group to prolong the battery life of one or more devices. The disclosed media playback system employs different charging schemes for playback devices in an effort to reduce battery degradation and preserve or prolong battery life. By permitting batteries to be charged in accordance with dynamic charging schemes configured to reduce battery degradation and lengthen battery life, the media play back system's utility to one or more users is improved as compared to conventional approaches.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media play back system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

To facilitate synchronous playback, the playback device (s) described herein may, in some embodiments, be configurable to operate in (and/or switch between) different modes such as an audio playback group coordinator mode and/or an audio playback group member mode. While operating in the audio playback group coordinator mode, the playback device may be configured to coordinate playback within the group by, for example, performing one or more of the following functions: (i) receiving audio content from an audio source, (ii) using a clock (e.g., a physical clock or a virtual clock) in the playback device to generate playback timing information for the audio content, (iii) transmitting portions of the audio content and playback timing for the portions of the audio content to at least one other playback device (e.g., at least one other playback device operating in an audio playback group member mode), (iv) transmitting timing information (e.g., generated using the clock to the at least one other playback device; and/or (v) playing back the audio content in synchrony with the at least one other playback device using the generated playback timing information and/or the clock. While operating in the audio playback group member mode, the playback device may be configured to perform one or more of the following functions: (i) receiving audio content and playback timing for the audio content from the at least one other device (e.g., a playback device operating in an audio playback group coordinator mode); (ii) receiving timing information from the at least one other device (e.g., a playback device operating in an audio playback group coordinator mode); and/or (iii) playing the audio content in synchrony with at least the other playback device using the playback timing for the audio content and/or the timing information.

a. Suitable Media Playback System

Figure 1B:
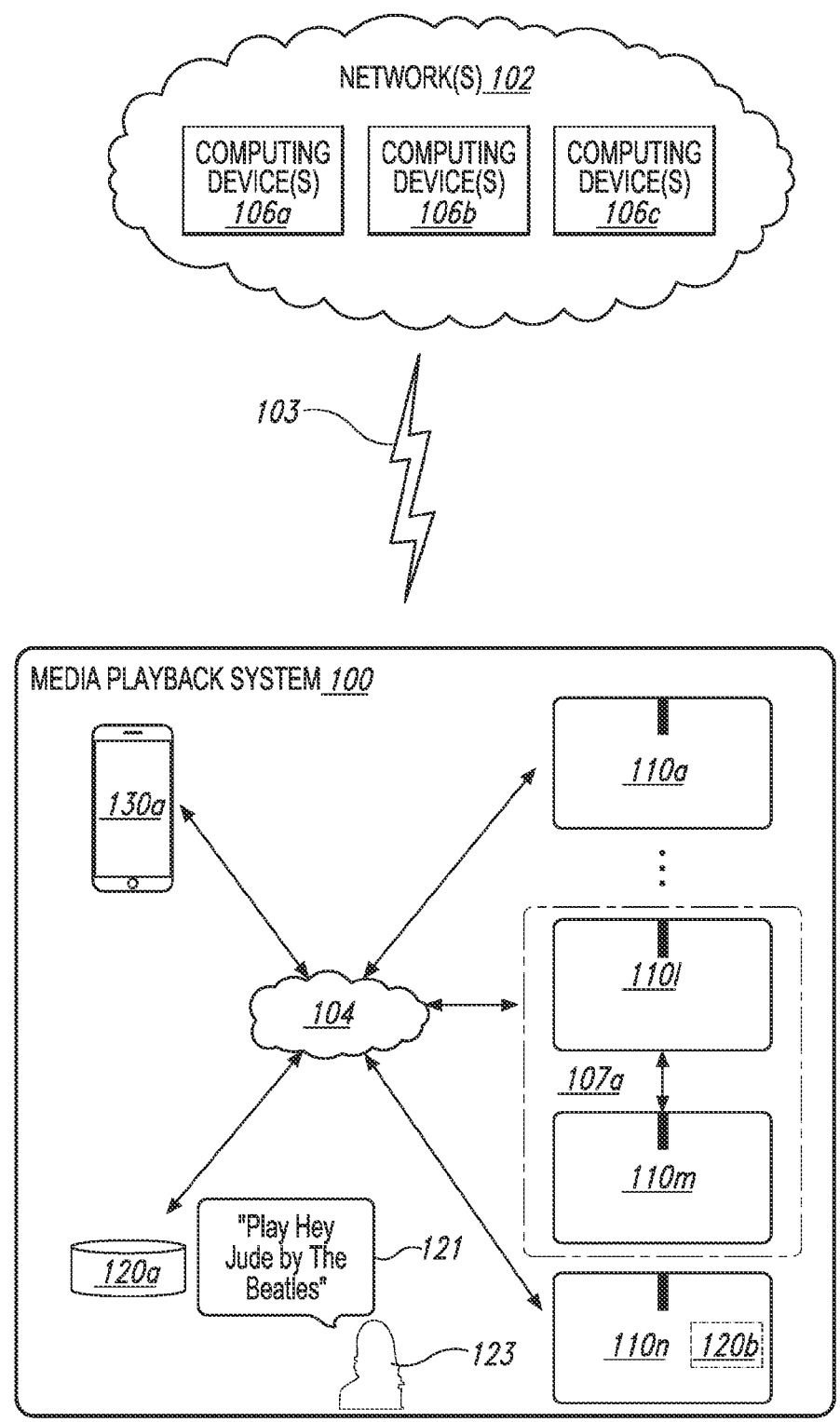
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WIFI networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media play back system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOSR, AMAZON®, GOOGLER APPLER, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
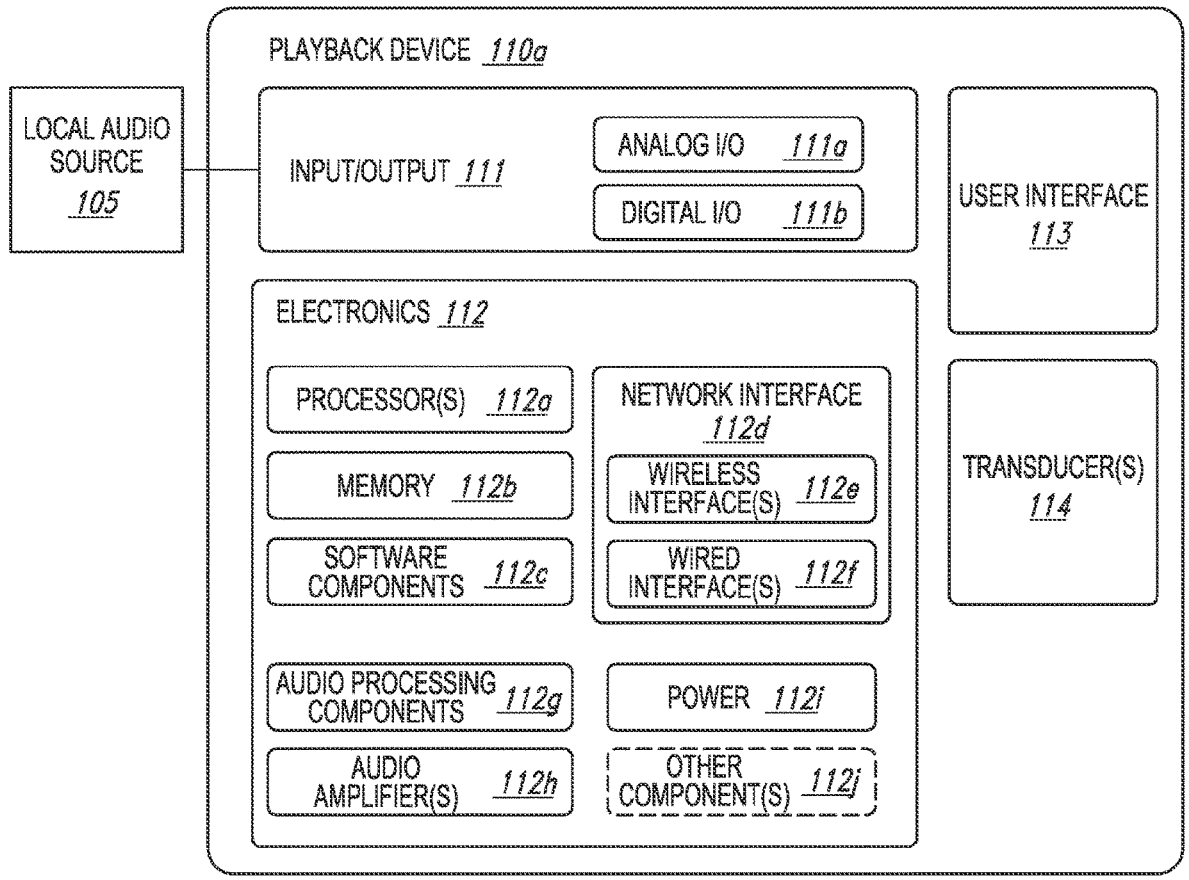
FIG. 1C shows a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

As described in more detail elsewhere herein, in some examples the power components 112i can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, the playback device 110a can be configured to transmit wireless power to one or more external devices. Additionally or alternatively, the playback device 110a can be configured to receive wireless power from one or more external transmitter devices, instead of or in addition to receiving power over a wired connection.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous play back of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media play back system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY: 1," "PLAY: 3," "PLAY: 5," "PLAYBAR," "PLAYBASE," "CONNECT: AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). The headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more of earcups may include a user interface for controlling operation of the headphone such as for controlling audio playback, volume level, and other functions. The user interface may include any of a variety of control elements such as buttons, knobs, dials, touch-sensitive surfaces, and/or touchscreens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)).

Additionally (or alternatively), the headphone may employ active noise reduction (ANR) techniques to further reduce the user's perception of outside noise during playback.

In some instances, the headphone device may take the form of a hearable device. Hearable devices may include those headphone devices (e.g., ear-level devices) that are configured to provide a hearing enhancement function while also supporting play back of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

Figure 1D:
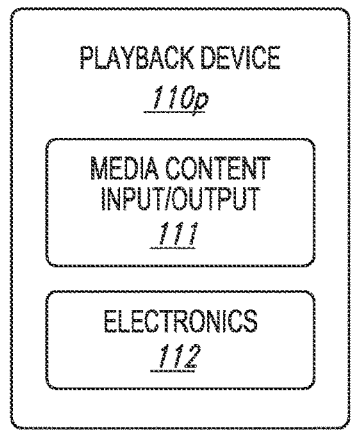
FIG. 1D shows a block diagram of a playback device.

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
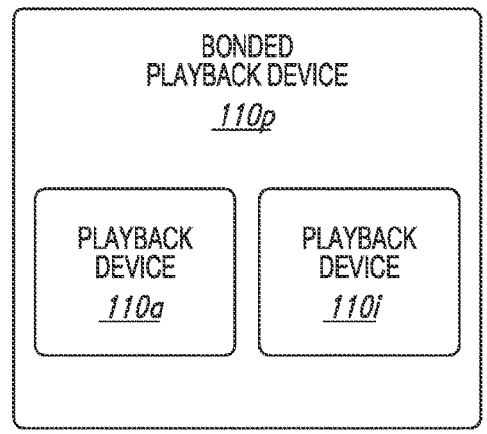
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, the power components 112i, and the microphones 115. As described elsewhere herein, the power components 112i can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, an NMD 120a can be configured to transmit wireless power to one or more external devices. Additionally or alternatively, the NMD 120a can be configured to receive wireless power from one or more external transmitter devices, in addition to or instead of receiving power over a wired connection.

The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media play back system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media play back system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media play back system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Figure 1M:
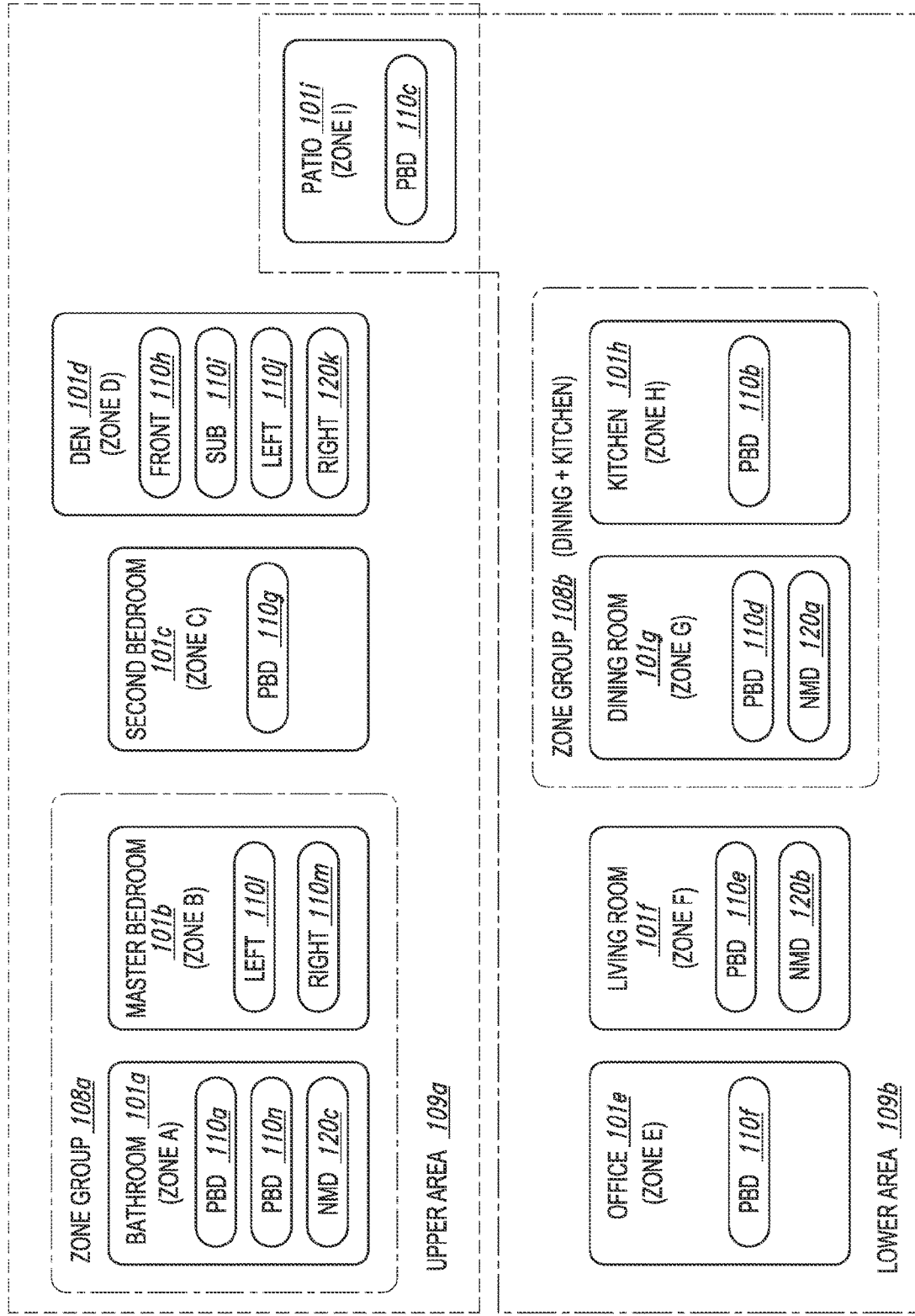
FIG. 1M shows a schematic diagram of media playback system areas.

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
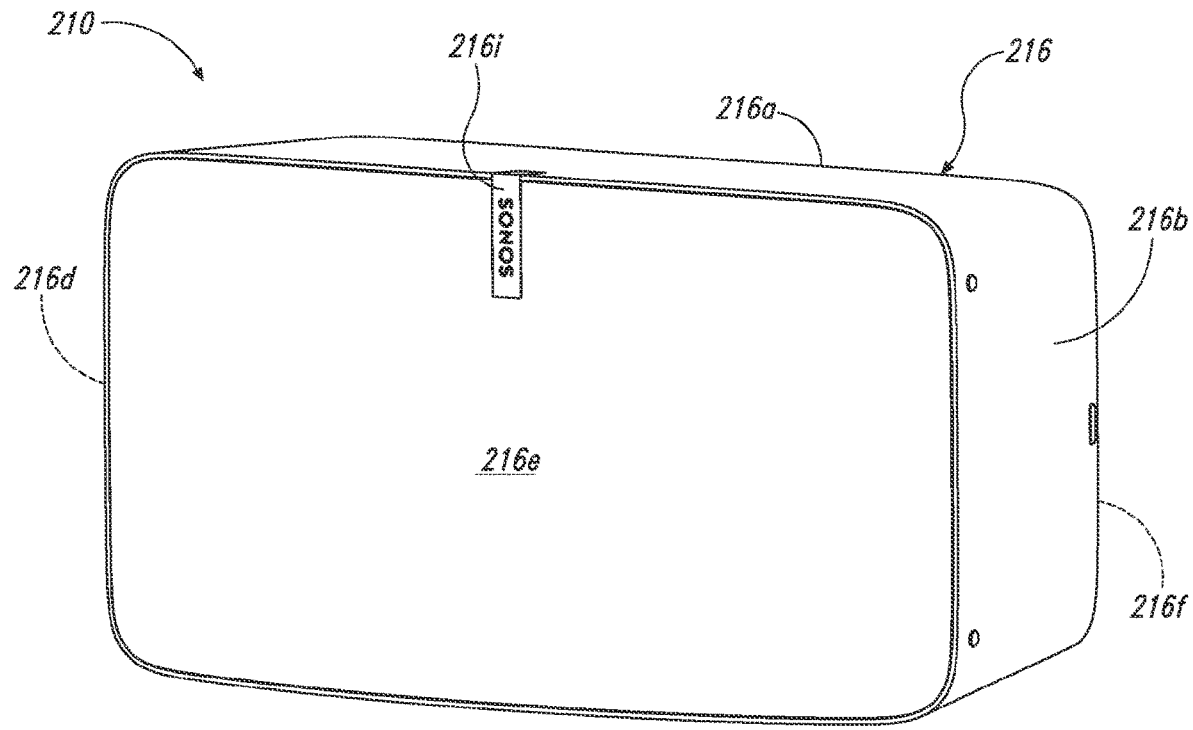
FIG. 2A shows a front isometric view of a playback device configured in accordance with aspects of the disclosed technology.
Figure 2B:
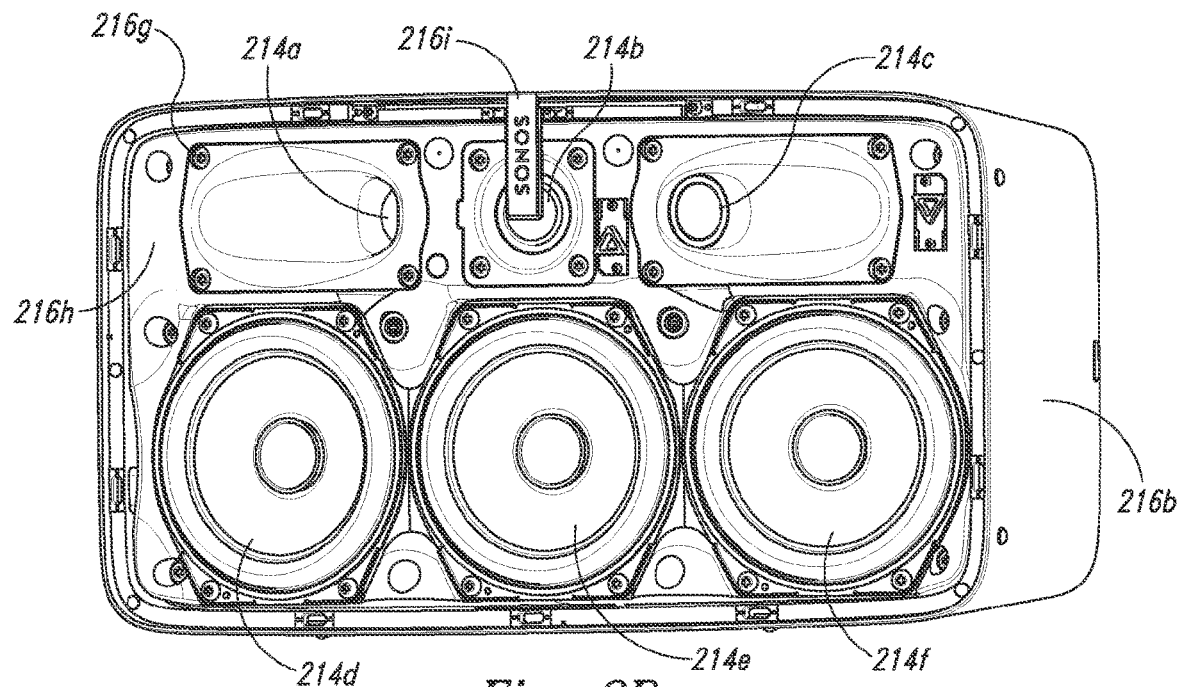
FIG. 2B shows a front isometric view of the playback device of FIG. 3A without a grille.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 2D:
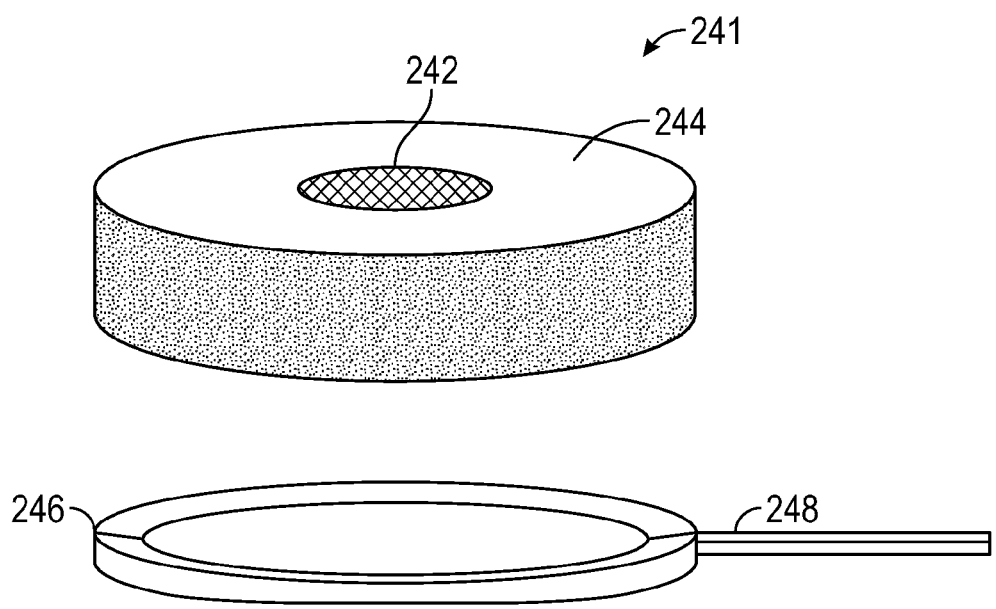
FIG. 2D is a diagram of another example housing for a playback device.

In some examples, the playback device 210 may be constructed as a portable playback device, such as an ultra-portable playback device, that comprises an internal power source. FIG. 2D shows an example housing 241 for such a portable playback device. As shown, the housing 241 of the portable playback device includes a user interface in the form of a control area 242 at a top portion 244 of the housing 241. The control area 242 may include a capacitive touch sensor for controlling audio playback, volume level, and other functions. The housing 241 of the portable playback device may be configured to engage with a dock 246 that is connected to an external power source via cable 248. The dock 246 may be configured to provide power to the portable playback device to recharge an internal battery. In some examples, the dock 246 may comprise a set of one or more conductive contacts (not shown) positioned on the top of the dock 246 that engage with conductive contacts on the bottom of the housing 241 (not shown). In other examples, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2E:
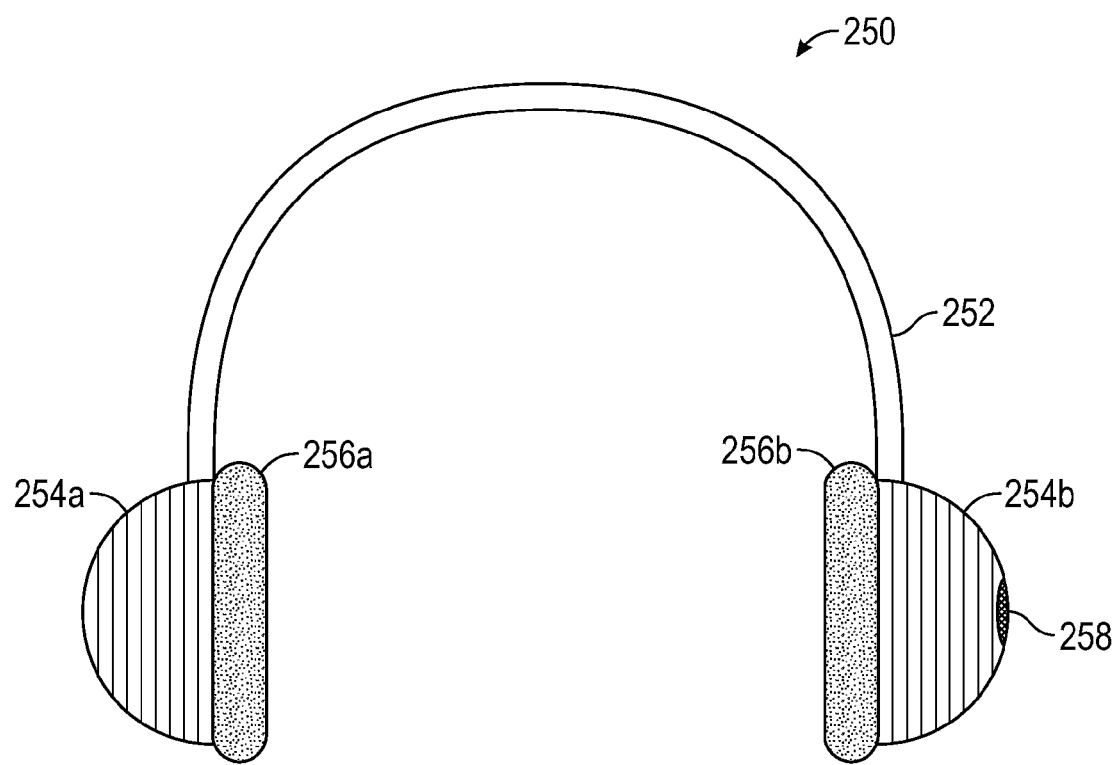
FIG. 2E is a diagram of another example housing for a playback device.

In some examples, the playback device 210 may take the form of a wired and/or wireless headphone (e.g., an over-ear headphone, an on-ear headphone, or an in-ear headphone). For instance, FIG. 2E shows an example housing 250 for such an implementation of the playback device 210. As shown, the housing 250 includes a headband 252 that couples a first earpiece 254a to a second earpiece 254b. Each of the earpieces 254a and 254b may house any portion of the electronic components in the playback device, such as one or more speakers, and one or more microphones. In some instances, the housing 250 can enclose or carry one or more microphones. Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). In some implementations, the wired and/or wireless headphones may be ultra-portable playback devices that are powered by an internal energy source and weigh less than fifty ounces.

In some examples, the playback device 210 may take the form of an in-ear headphone device. It should be appreciated that the playback device 210 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 210 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described herein, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 210 is described with reference to MPS 100, one skilled in the art will recognize that playback devices as described herein can be used in a variety of different environments, including (but not limited to) environments with more and/or fewer elements, without departing from this invention. Likewise, MPSs as described herein can be used with various different playback devices.

Figure 3A:
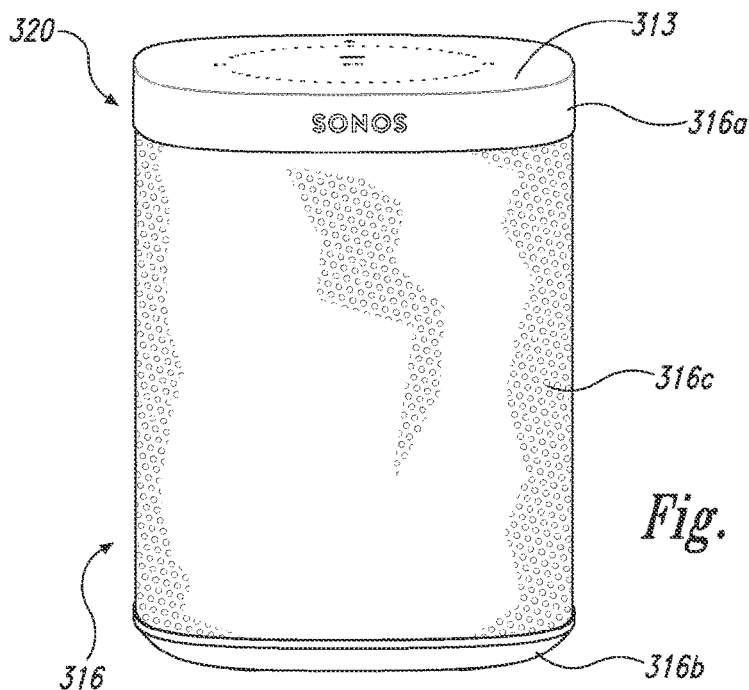
FIG. 3A shows a front view of a network microphone device configured in accordance with aspects of the disclosed technology.
Figure 3B:
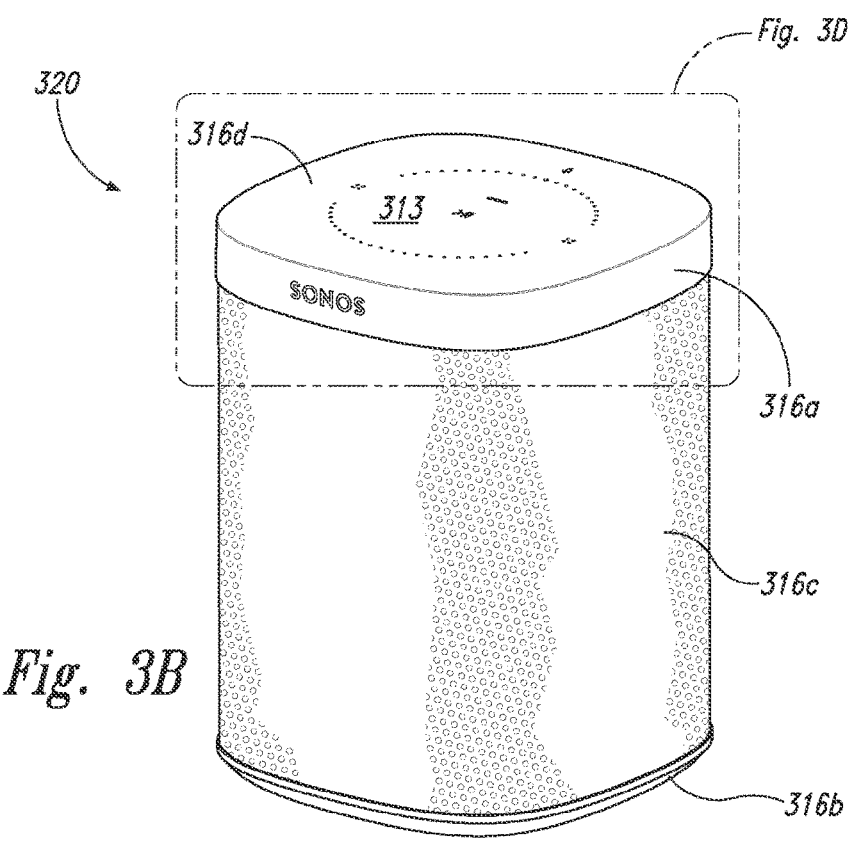
FIG. 3B shows a side isometric view of the network microphone device of FIG. 3A.
Figure 3C:
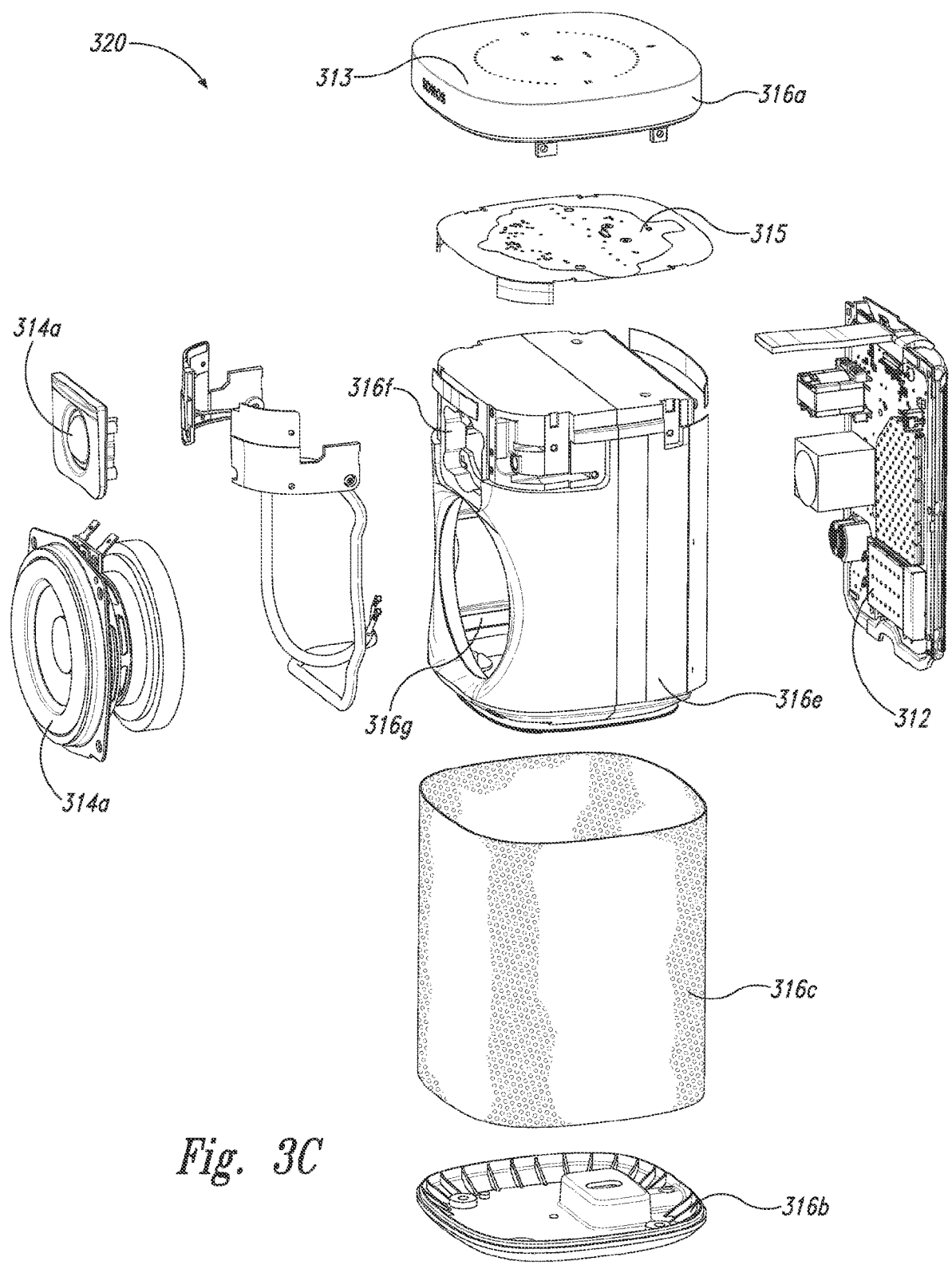
FIG. 3C shows an exploded view of the network microphone device of FIGS. 3A and 3B.
Figure 3D:
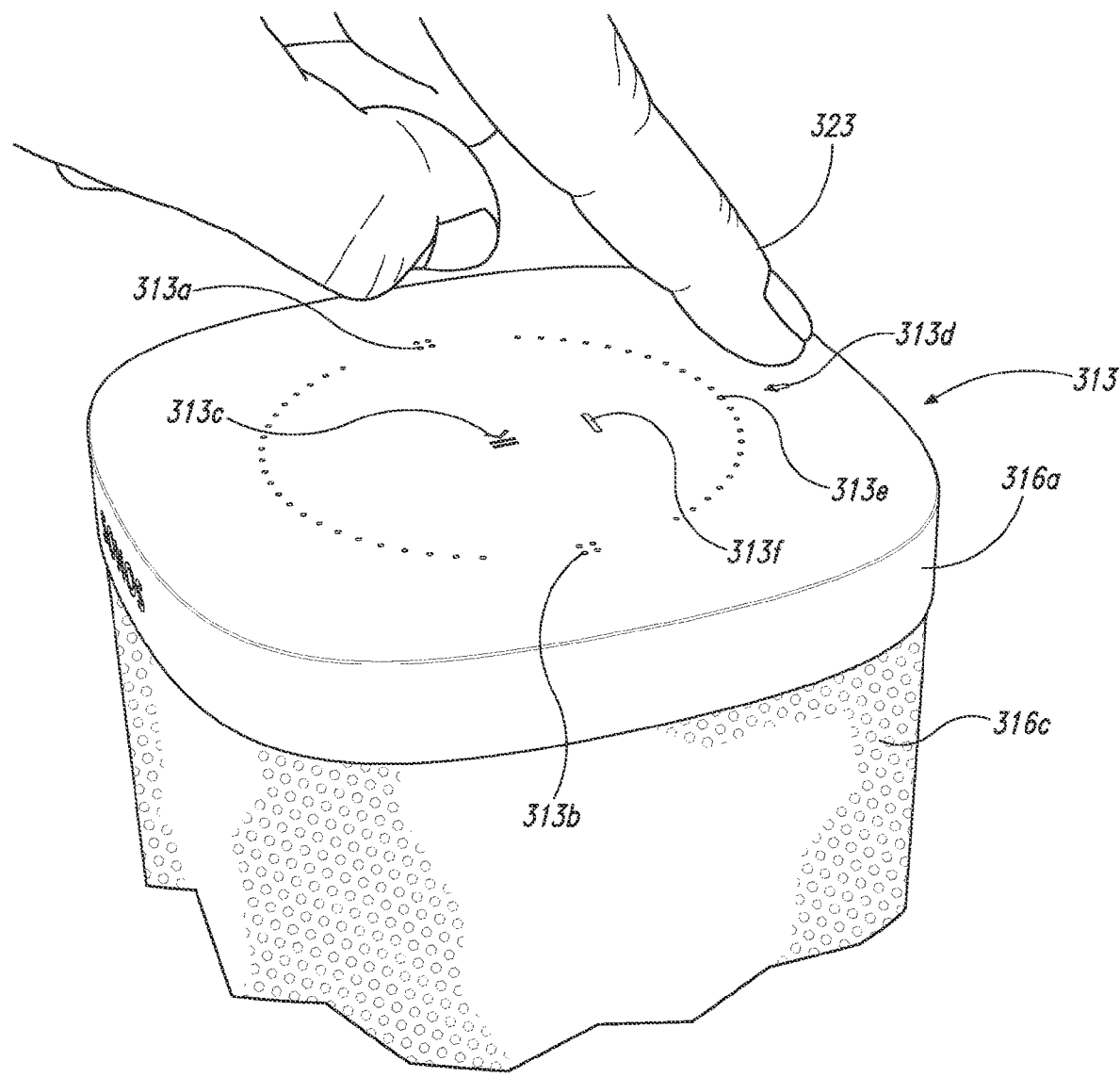
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
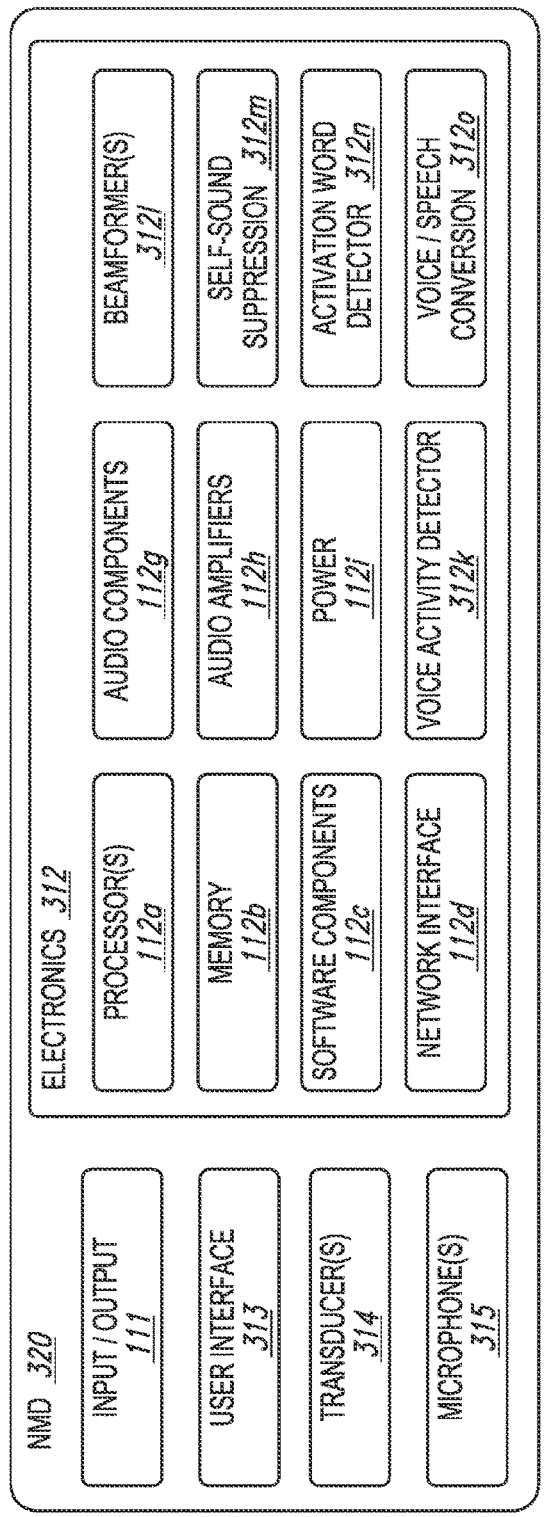
FIG. 3E shows a block diagram of the network microphone device of FIGS. 3A-3D.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g., AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media play back systems.

Figure 3F:
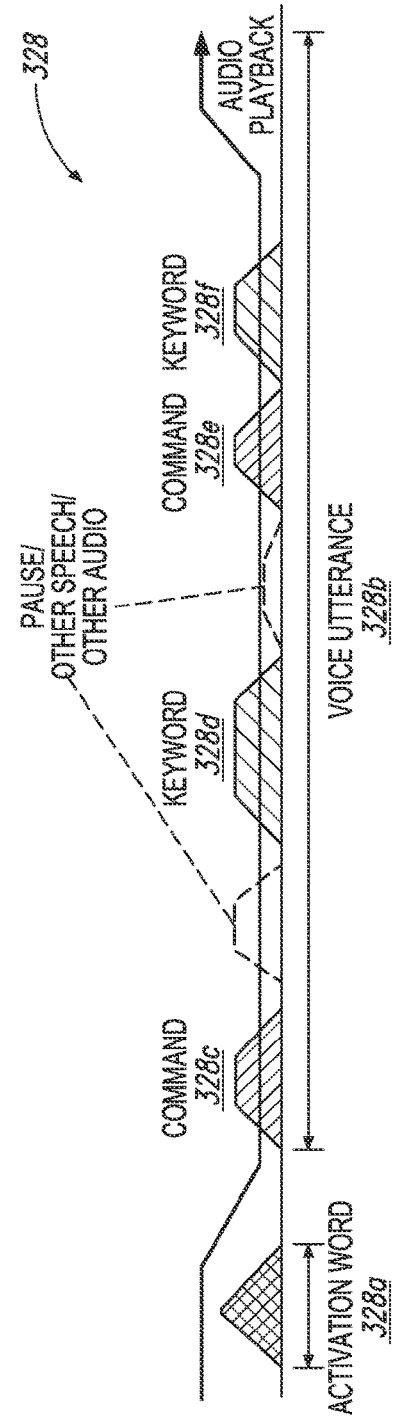
FIG. 3F shows a schematic diagram of an example voice input.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
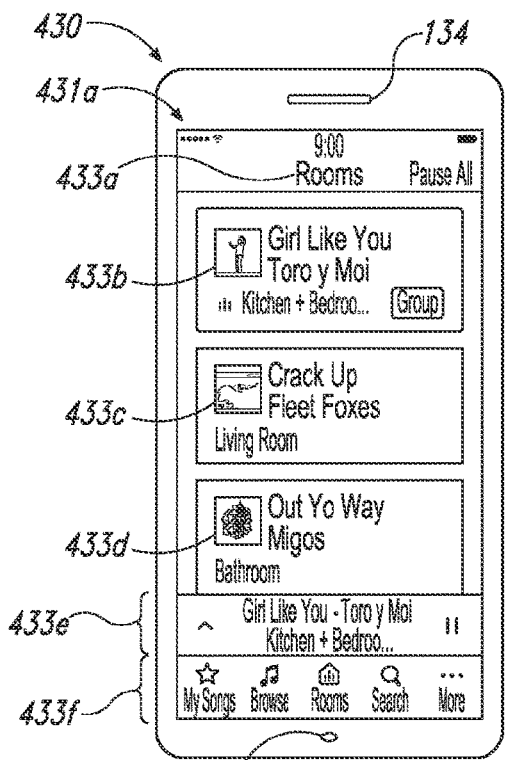
FIGS. 4A-4D show schematic diagrams of a control device in various stages of operation in accordance with aspects of the disclosed technology.
Figure 4B:
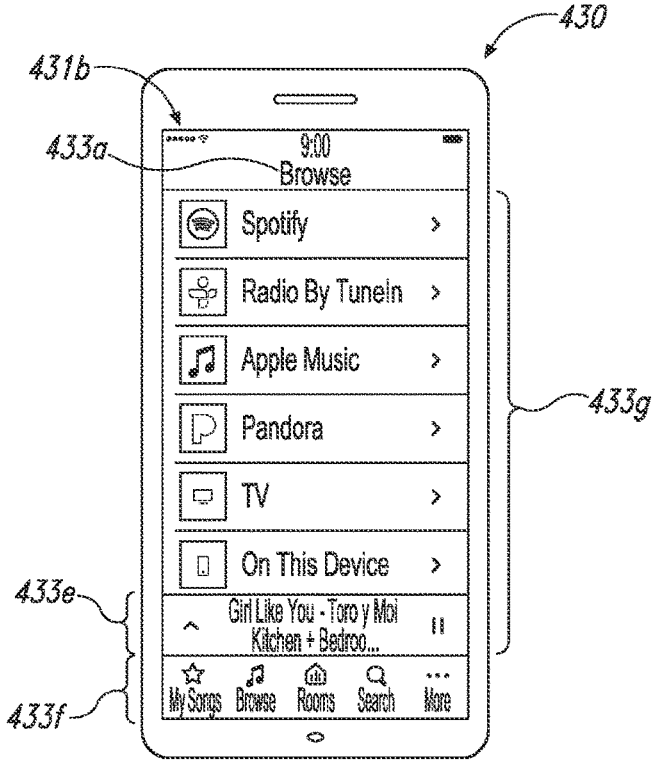
Figure 4C:
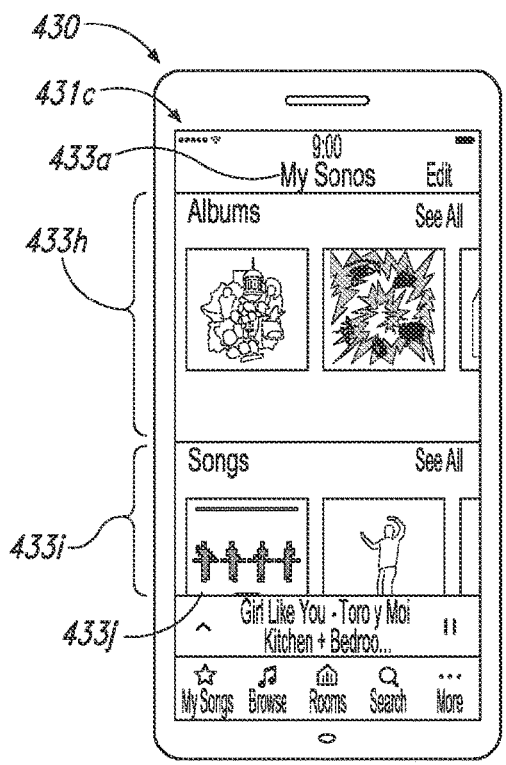
Figure 4D:
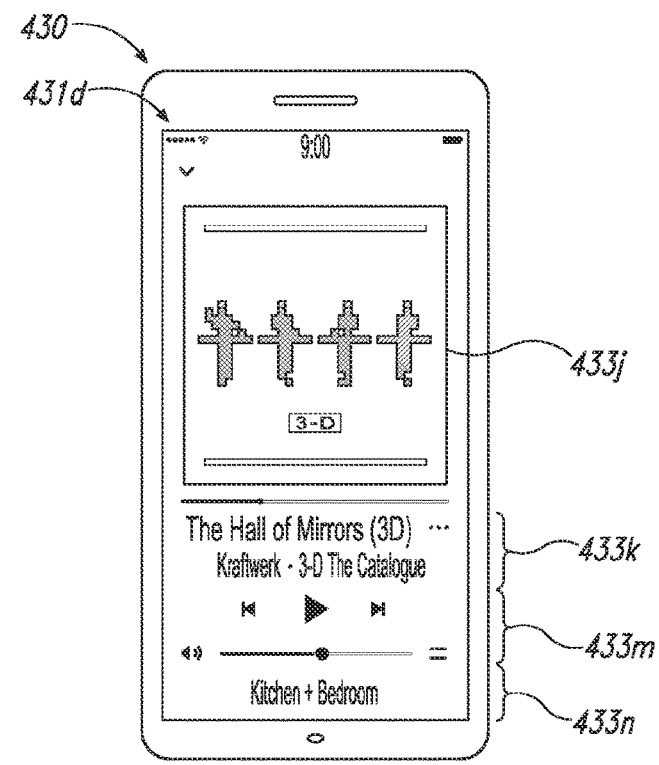

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
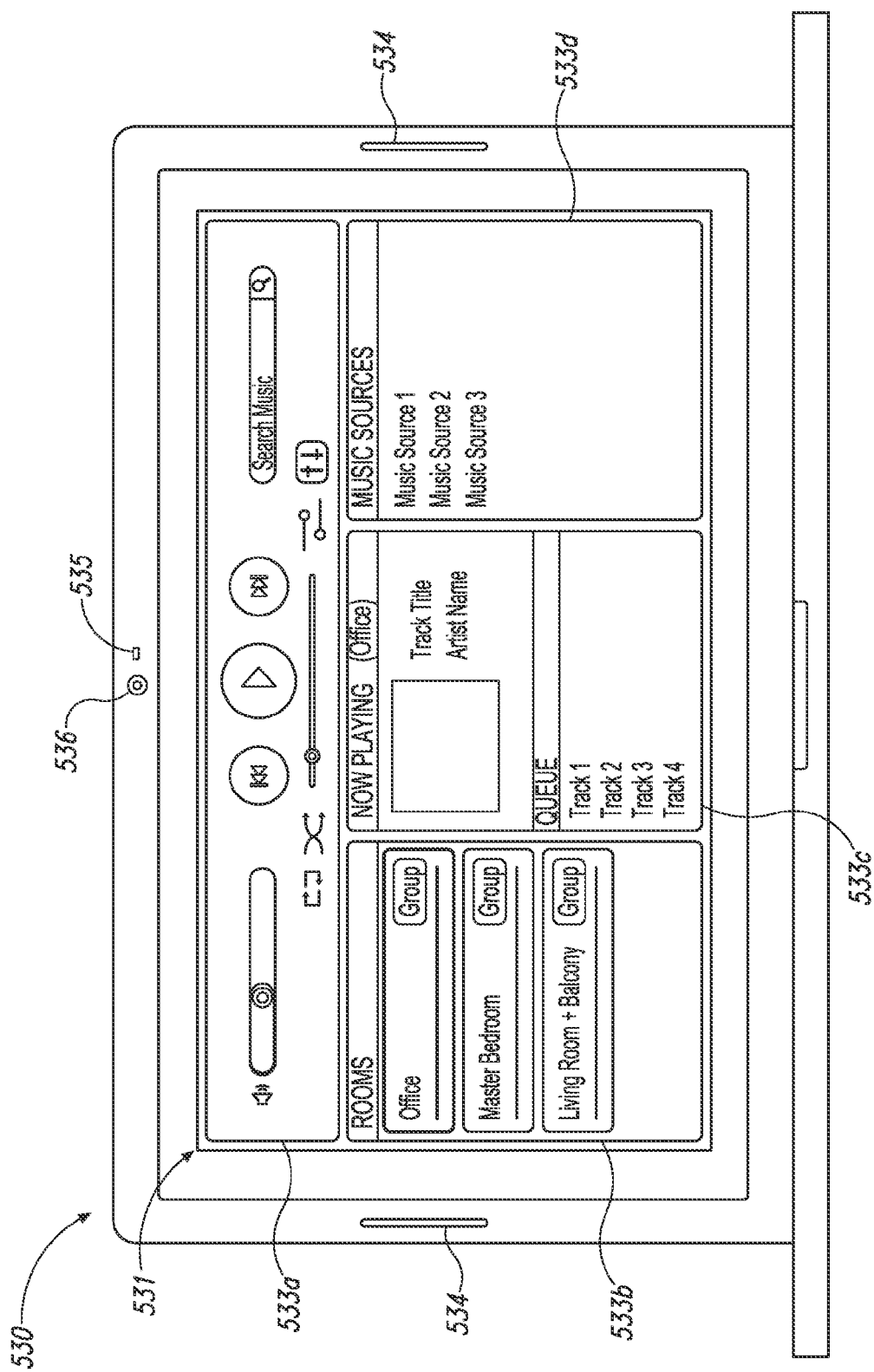
FIG. 5 shows a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as a playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the play back zone or zone group. For instance, each audio item in the playback queue may comprise a uniform resource identifier (URI), a uniform resource locator (URL) or some other identifier that may be used by a play back device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the play back queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
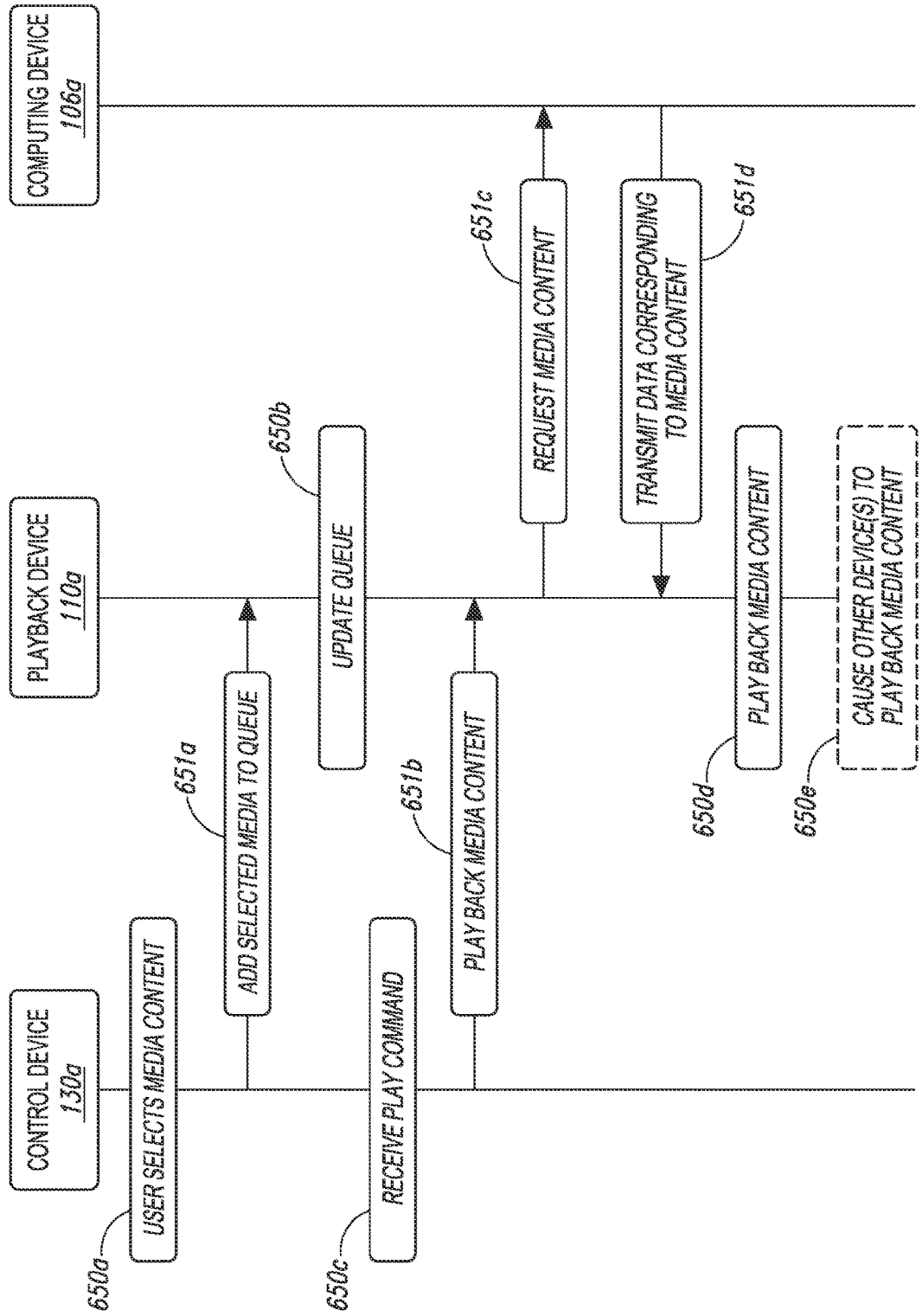
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media play back system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Wireless Power Transfer Devices and Associated Systems and Methods

Audio playback devices capable of receiving wireless power provide several distinct advantages over conventional wired devices. For example, there is no need to hide unsightly power cords by routing them through a wall or underneath furniture. Wireless power transfer may also allow a user to reposition devices more easily around a home or room without needing to disconnect or re-route power cords. To enable this functionality, one or more wireless power transmitter devices can be provided in the vicinity of an audio playback device having a wireless power receiver therein. Such a transmitter device can include another playback device (e.g., a soundbar, subwoofer, or any playback device having a wired power connection), or a non-playback device (e.g., a power hub that provides wireless power to the playback device without itself driving audio output). In some examples, one or more playback devices can include both a wireless power receiver and a wireless power transmitter, such that these devices may be used in either configuration, or in some instances may be used in both configurations simultaneously (e.g., as a "relay" in which a device receives wireless power from an external transmitter device and transmits wireless power to an external receiver device). In some instances, a plurality of such playback devices can transfer wireless power among one another in a mesh configuration, with the particular device-to-device transmission being selected to provide the desired power levels, device performance, and user experience.

As used herein, a "wireless power transmitter" or "transmitter device" includes any device (or component(s) of a device) capable of sending wireless power that can be received and recovered by a suitable receiver device. Similarly, a "wireless power receiver" or "receiver device" includes any device (or component(s) of a device) capable of receiving wireless power from a remote transmitter device and utilizing that power to operate one or more components of the receiver device (e.g., to power at least one amplifier of a playback device). In various examples, a single playback device (or other device) can be both a wireless power transmitter and a wireless power receiver, while in other examples a particular device may be only a transmitter device or only a receiver device.

In various examples disclosed herein, such wireless power transfer can include mid- or long-range wireless power transfer. As used herein, mid- and long-range wireless power transfer includes wireless power transfer over a distance of greater than about 10 cm, or in some examples greater than about 50 cm or greater than about 1 m. For example, in some instances a wireless power transmitter device and a wireless power receiver device can be separated from one another by at least about 10 cm, at least about 50 cm, or at least about 1 m during wireless power transfer.

As noted elsewhere herein, such mid- or long-range wireless power transfer technologies include radiative techniques (e.g., lasers, radio waves, microwaves, or other such propagation of electromagnetic radiation from the transmitter device towards the receiver device). In various examples, the wireless power receiver in such instances can include a photovoltaic cell, a diode, an antenna (e.g., a rectenna), or other suitable hardware that can convert electromagnetic radiation into electrical energy. Similarly, the wireless power transmitter in such instances can include an optical source such as a laser, a microwave source, an antenna (e.g., directional antennas, phased array antennas, etc.), or other suitable source of electromagnetic radiation.

Additionally or alternatively, such mid- or long-range wireless power transmission can include non-radiative transmission such as electromagnetic coupling (e.g., inductive coupling, resonant inductive coupling, capacitive coupling, resonant capacitive coupling, magnetodynamic coupling, etc.). In such instances, both the wireless power transmitter and the wireless power receiver can include electrically conductive coils (e.g., in the case of inductive coupling), electrodes (e.g., in the case of capacitive coupling), or rotating armatures carrying magnets thereon (e.g., in the case of magnetodynamic coupling).

a. Suitable Wireless Power Transfer Device Components

Figure 7:
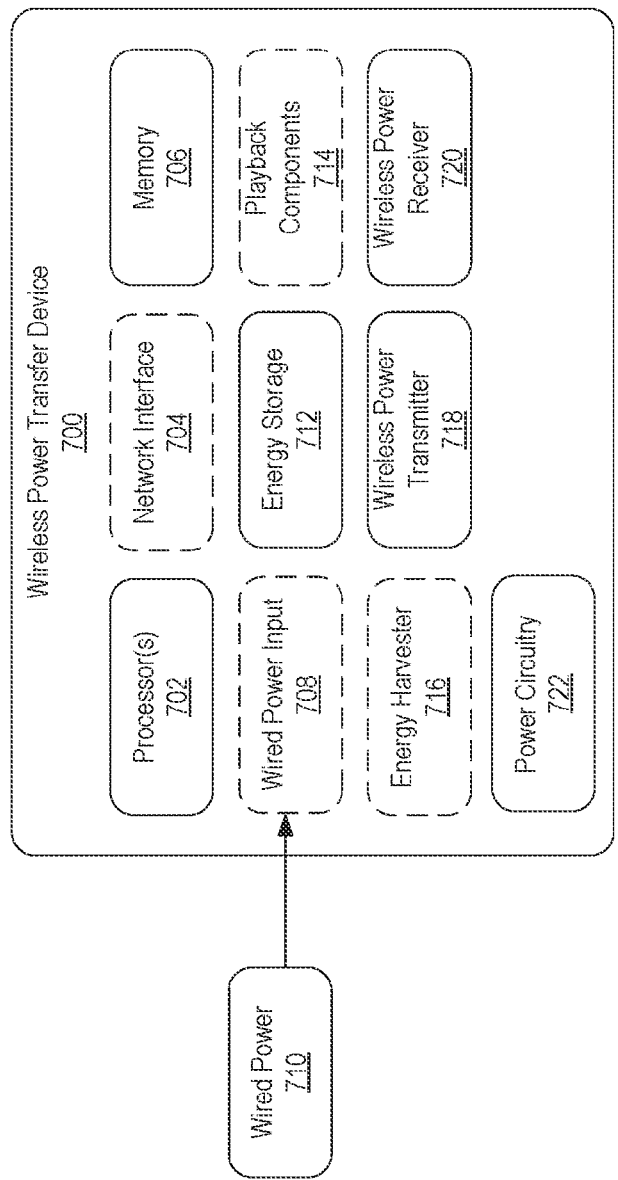
FIG. 7 shows an example configuration of a wireless power transfer device in accordance with the disclosed technology.

FIG. 7 is a schematic block diagram of a wireless power transfer (WPT) device 700. In some examples, the device 700 can be coupled to, integrated into, or included within a playback device (e.g., playback device 110a of FIG. 1C), an NMD (e.g., NMD 120a of FIG. 1F), or other suitable device.

Referring to FIG. 7, the WPT device 700 includes one or more processors 702, a network interface 704, and memory 706. These can be similar to, identical to, or include, processors 112a, network interface 112d, and memory 112b described above with respect to FIGS. 1C and 1F. In various examples, the wireless power transfer device 700 can include any or all of the features of playback device 110a or NMD 120a described previously herein. In some examples, the network interface 704 can include one or more transceivers that are configured to communicate via at least one WIFI network, and/or at least one BLUETOOTH network.

WPT device 700 optionally includes a wired power input port 708 that is configured to be electrically coupled to wired power 710 (e.g., via 110/220V wall power, a USB-C charger, etc.), such as an AC power port or a USB port (e.g., a USB TYPE-A port, a USB TYPE-B port, a USB TYPE-C port, etc.). The power input port 708 can be coupled (e.g., via cable) directly to a household power outlet (e.g., to receive alternating current (AC) power) or indirectly via a power adapter (e.g., a device that converts the AC power from the household power outlet to direct current (DC) power). In some examples, the wired power input port 708 is omitted, and the WPT device 700 operates solely on the basis of power received wirelessly from external transmitter device(s) and/or energy generated via energy harvester(s) 716.

The WPT device 700 further includes an energy storage component 712, which can take the form of a rechargeable battery, a capacitor, a supercapacitor, or any other suitable component that can store energy. The energy storage component 712 can be configured to store energy and to facilitate operation of the device (e.g., powering one or more amplifiers of a playback device). In this regard, the energy storage component 712 can be a battery that has a chemistry that facilitates recharging the battery, such as lithium-ion (Li-ion), nickel-metal hydride (NiMH), nickel-cadmium (NiCd), etc. The battery can be sized such that the processor(s) 702 and other components of the WPT device 700 can operate on battery power alone for an extended amount of time without the battery needing to be recharged. For example, the battery can have a 20 watt-hours (Wh) capacity that facilitates continuous playback of audio for at least 4 hours on battery power alone. The battery can be charged using power from one or more other components in the device 700 (e.g., wired power input port 708, wireless power receiver 720, energy harvester 716, etc.).

As noted previously, in some examples, the wireless power device 700 can include audio playback components 714 (e.g., one or more transducers, audio processing circuitry, microphones, voice processing circuitry, etc.), and as such the WPT device 700 can include or be part of an audio playback device or a network microphone device as described elsewhere herein. In various examples, such an audio playback device can be a soundbar, a subwoofer, a headphone device, a hearable device, a portable audio playback device, an architectural playback device, or a video playback device.

The WPT device 700 optionally includes one or more energy harvesters 716. Energy harvesters 716 may include those devices configured to derive power from energy sources in the environment (e.g., solar energy, thermal energy, wind energy, salinity gradients, kinetic energy, sound energy, etc.). For example, the energy harvesters 716 can include one or more photovoltaic cells configured to convert received light into a voltage. Any of a variety of energy harvesters 716 may be included in the WPT device 700. Examples of such energy harvesters include photovoltaic cells, thermoelectric generators, micro wind turbines, piezoelectric crystals, electroacoustic transducers, and kinetic energy harvesters.

The WPT device additionally includes a wireless power transmitter 718, a wireless power receiver 720, and power circuitry 722. In operation, the WPT device 700 can receive wireless power from an external transmitter device via the receiver 720, and can transmit wireless power to an external receiver device via the transmitter 718, with the power circuitry 722 controlling some or all of the functions associated with these operations.

The wireless power transmitter 718 can include any component or combination of components capable of transmitting wireless power to an external wireless power receiver device. Such wireless power transfer can include mid- or long-range wireless power transfer, for example being configured to provide effective power transfer with the transmitter and receiver separated from one another by a distance of greater than about 10 cm, or in some examples greater than about 50 cm or greater than about 1 m. In various examples, the wireless power transmitter 718 can transmit power via radiative techniques such as using lasers, radio waves, microwaves, or other such techniques involving propagation of electromagnetic radiation from the transmitter device towards the receiver device. In various embodiments, such electromagnetic radiation may be directional (e.g., directed towards one or more receiver devices) or omnidirectional (e.g., radiating in substantially all directions from the wireless power transmitter 718). In various examples, the wireless power transmitter 718 in such instances can include an optical source such as a laser, a microwave source, an antenna (e.g., directional antennas, phased array antennas, etc.), or any other source of electromagnetic radiation. In some instances, the wireless power transmitter 718 can include one or more steering components configured to direct, focus, or steer wireless power. Such steering components can include, for example, one or more lenses, mirrors, directional antennas, or other suitable components.

Additionally or alternatively, the wireless power transmitter 718 can be configured to transmit wireless power using non-radiative techniques such as electromagnetic coupling (e.g., inductive coupling, resonant inductive coupling, capacitive coupling, resonant capacitive coupling, magnetodynamic coupling, etc.). In such instances, the wireless power transmitter 718 can include electrically conductive coils (e.g., in the case of inductive coupling), electrodes (e.g., in the case of capacitive coupling), rotating armatures carrying magnets thereon (e.g., in the case of magnetodynamic coupling), or any other suitable structure capable of receiving power wirelessly via electromagnetic coupling.

The wireless power receiver 720 can include any component or structure configured to receive power wirelessly (e.g., via inductance, resonance, radiation, etc.) from an external wireless transmitter device. As noted previously, such wireless power transfer can include mid- or long-range wireless power transfer, for example being configured to provide effective power transfer with the transmitter and receiver separated from one another by a distance of greater than about 10 cm, or in some examples greater than about 50 cm or greater than about 1 m. In various examples, the wireless power receiver 720 can receive power via radiative techniques such as lasers, radio waves, microwaves, or other such techniques involving propagation of electromagnetic radiation from the transmitter device towards the receiver device. The wireless power receiver 720 in such instances can include an optical receiver such as a diode, a photovoltaic cell, an antenna (e.g., a rectenna), or other suitable hardware that can convert electromagnetic radiation into electrical energy.

Additionally or alternatively, the wireless power receiver 720 can be configured to receive wireless power using non-radiative techniques such as electromagnetic coupling (e.g., inductive coupling, resonant inductive coupling, capacitive coupling, resonant capacitive coupling, magnetodynamic coupling, etc.). In such instances, the wireless power receiver 720 can include electrically conductive coils (e.g., in the case of inductive coupling), electrodes (e.g., in the case of capacitive coupling), a rotating armature carrying a magnets thereon (e.g., in the case of magnetodynamic coupling), or any other suitable structure capable of receiving power wirelessly via electromagnetic coupling.

With continued reference to FIG. 7, the WPT device 700 can include power circuitry 722 configured to receive power from the energy storage component 712, the wired power input 708, and/or the wireless power receiver 720, and, using the power obtained therefrom, drive an amplifier and/or an electroacoustic transducer with an audio output based on source audio. The power circuitry 722 can be configured to perform any of a variety of power-related tasks including, for example, one or more of the following: (1) power conversion (e.g., AC-AC conversion, AC-DC conversion, DC-AC conversion, and/or DC-DC conversion); (2) power regulation; (3) battery charging; and/or (4) power monitoring (e.g., battery monitoring). Examples of electrical components that may be integrated into the power circuitry 722 include transformers, rectifiers, inverters, converters, regulators, battery chargers, and/or power management integrated circuits (PMICs). In some examples, such power circuitry 722 can be integrated into either or both the wireless power transmitter 718 and the wireless power receiver 720.

In some examples, the power circuitry 722 can include battery circuitry that facilitates monitoring a state of a battery. In these examples, the battery circuitry can identify battery state information that includes information regarding one or more of the following battery states: a state-of-charge (SoC), temperature, age, and/or internal impedance. The battery circuitry can communicate the battery state information to, for example, the processor 702.

The power circuitry 722 can include regulation circuitry that facilitates converting a variable amount of voltage (e.g., a variable voltage from a battery, a variable voltage from an energy harvester, etc.) to a stable DC voltage. For example, the regulation circuitry can include switching regulator circuitry such as buck, boost, buck-boost, flyback, resonant, etc. switching regulator circuitry. The regulation circuitry can include one or more linear voltage regulators such as low-dropout (LDO) regulators. The regulation circuitry can be configured to output one or more fixed DC voltages (e.g., +5V, +12V) or AC voltages.

b. Wireless Power Group Examples

Figure 8:
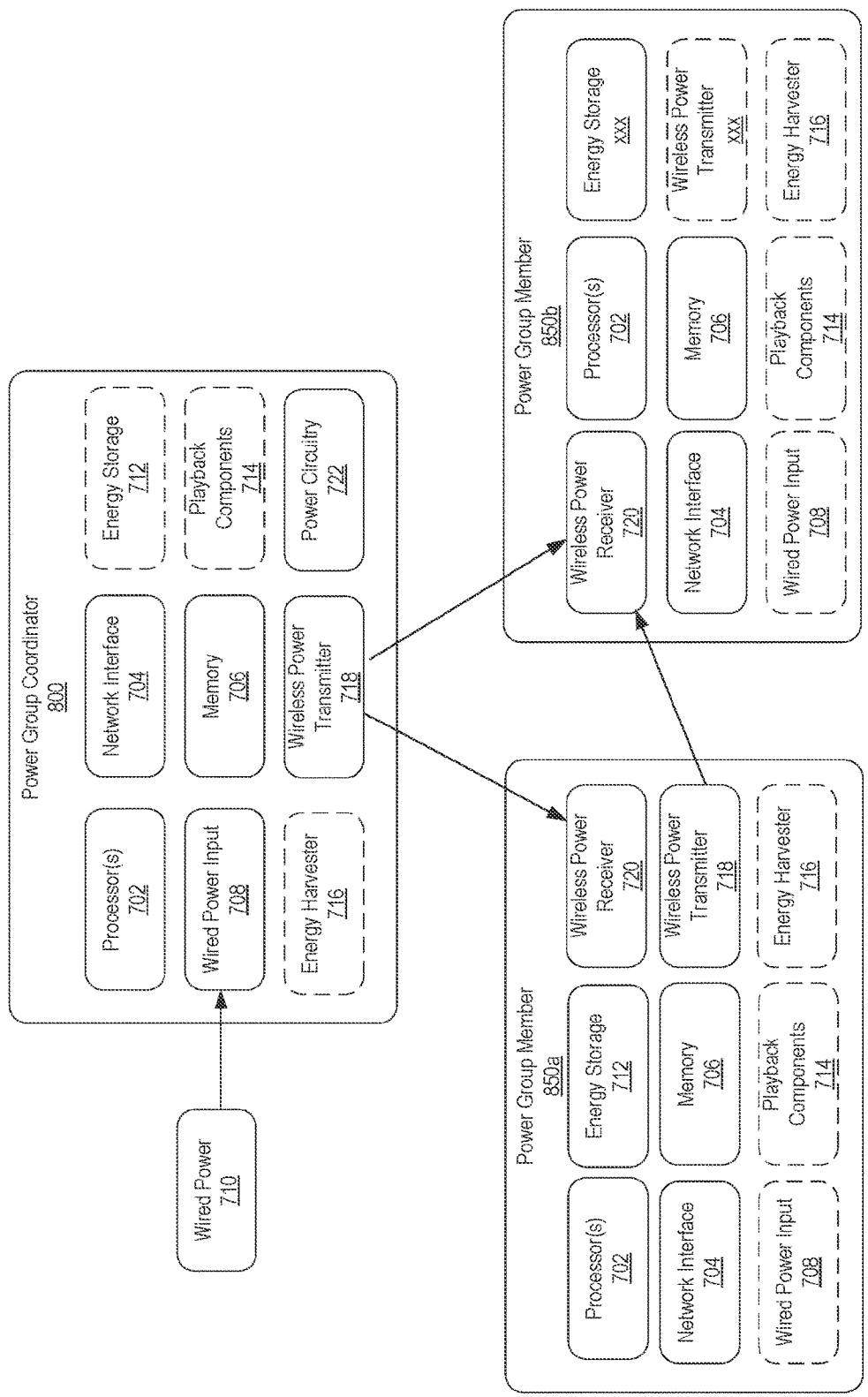
FIG. 8 shows an example configuration of a wireless power group in accordance with the disclosed technology.

FIG. 8 shows interactions among a power group, which includes a plurality of WPT devices that can transfer power and/or data among one another. In the example shown in FIG. 8, the group includes a power group coordinator 800, and first and second power group members 850a and 850b. Each of the power group coordinator 800 and the power group members 850a and 850b can include some or all of the components described above with respect to the WPT device 700 of FIG. 7. In some examples, some or all of these devices can include or be audio playback devices. Although the illustrated group includes three devices, in various examples there may be one, two, four, five, or many more power group members (not shown).

As used herein, a "power group" can include two or more devices that are configured to wirelessly transfer power therebetween. In the illustrated example, the coordinator 800 transmits wireless power (e.g., via wireless power transmitter 718) to each of the first power group member 850a and the second power group member 850b. Additionally, the first group member 850a transmits wireless power to the second power group member 850b. In alternative examples, the power group coordinator 800 may transmit wireless power to fewer than all members of the wireless power group, with one or more group members 850 transmitting power to other group members 850 such that each device of the group receives or transmits wireless power to or from at least one other device of the group.

In the illustrated example, the power group coordinator 800 does not include a wireless power receiver 720, and it is connected to wired power 710. However, in other instances the power group coordinator 800 may have no connection to wired power 710, and may itself only be powered via wireless power transmission and/or energy harvesting. In some examples, one or more of the power group members 850 may be connected to wired power instead of or in addition to receiving wireless power from other group members.

As used herein, a "power group coordinator" can include a wireless power transfer device that is configured to transmit instructions to one or more power group members to initiate, cease, or modulate wireless power transmission therebetween. For example, a power group coordinator may cause the first power group member 850a to initiate wireless power transmission to the second power group member 850b. As described in more detail elsewhere herein, in some examples wireless power transmission may be initiated, ceased, or modified based on a number of parameters (e.g., a battery level of a device, a level or rate or wireless power received at a device, audio playback levels, etc.). In some examples, such parameters may be determined by or transmitted to the power group coordinator 800, which may then determine any appropriate modifications to wireless power transfer within the group, and may transmit instructions to group members accordingly.

In at least some instances, there may be no power coordinator. In such cases, each wireless power transfer device may independently determine whether, how, and when to transmit or receive wireless power from any external transmitter or receiver devices.

As noted previously, in some examples a plurality of audio playback devices can be grouped together for synchronous audio playback (e.g., as a bonded zone). In such instances, one of the playback devices may be a coordinator of the group, and may transmit and receive timing information from one or more other devices in the group. In various examples, the power group may be identical to the audio playback group. Alternatively, the power group may differ at least in part from any audio playback grouping. In at least some examples, the power group coordinator 800 may also serve as an audio playback group coordinator. In such cases, the power group coordinator 800 may transmit timing data or other information to group members via a wireless network and/or via data incorporated into the wireless power signals, as described in more detail elsewhere herein. Alternatively, the power group coordinator 800 and the audio playback group coordinator may be different devices. In still other examples, the power group may be formed without any audio playback grouping taking place, in which case there may be no audio playback group coordinator.

V. Example Systems and Methods of Charging Playback Device Batteries

Systems and methods for charging power storages, such as batteries of playback devices associated with a media playback system, are disclosed. Using the disclosed systems and methods the media playback system can employ one or more charging schemes, for each battery of one or more playback devices, that reduce battery degradation and extend battery life as compared to conventional approaches. A media playback system may comprise one or more playback devices, including at least one playback device (e.g., a portable device) having its own power storage (e.g., battery) and an accompanying power source, such as a portable USB charger plugged into an outlet, a wireless charging cradle, a wireless power transfer system configured to wirelessly charge one or more devices, etc. configured to charge the power storage in accordance with one or more charging schemes. For example, in a conventional system each power storage is charged to a maximum charge capacity of the power storage as quickly as the hardware and power source will allow. The disclosed media playback system provides alternative charging schemes configured to reduce degradation and prolong usefulness of the power storages. For example, after receiving an instruction to form a group of two or more playback devices for synchronous audio playback, the media playback system can obtain power parameters associated with one or more of the playback devices, such as the power level, age, and/or temperature of each of their power storages, a power charging rate associated with their current charging scheme(s), playback responsibilities of each playback device in the group, abilities of each playback device in the group (e.g., peak power performance, ability to play low frequency content), etc. In the event that a playback device includes one or more energy harvesters, the power parameters can include an indication of power received via the one or more energy harvesters, a rate at which the one or more energy harvesters can harvest energy, etc. These power parameters may be transmitted by the playback devices themselves sent via one or more network interfaces to one or more other playback devices. In another example, the power parameters are obtained via a separate computing device, such as a server that stores or otherwise maintains information about power parameters of playback devices, a controller device (e.g., a remote control, smartphone, tablet, etc.), an IoT device, a power source, and so on. Based on one or more of these power parameters, the media playback system can identify one or more other charging schemes for each of the devices and configure the playback devices to charge in accordance with the corresponding charging schemes. For example, one charging scheme may reduce a target charge level for one of the power storages to a charge level that is less than its maximum charge capacity. As another example, one charging scheme may charge different power storages at different charge rates so that a playback device having a lower power storage level is charged faster than a playback device having a higher power storage level and/or so that the power storage levels of each of the playback devices reaches a corresponding threshold charge level at substantially the same time. After the one or more charging schemes are identified, the media playback system can employ the identified charging schemes by, for example, modifying a current charging scheme of a playback device, replacing one charging scheme for another, combining and/or scheduling multiple charging schemes, etc. Subsequently, the media playback system can revert from one charging scheme to a previous charging scheme by, for example, modifying or replacing a charging scheme, etc. For example, after receiving an instruction to ungroup one or more playback devices, the media playback system can revert the charging scheme of one or more playback devices to a previous charging scheme, such as a charging scheme that was previously replaced, modified, etc.

In one charging scheme, a battery is charged to a certain threshold or target charge level (e.g., a predetermined percentage of capacity, such as 30%, 50%, 75%, 90%, 95%, 100%, etc.) at a fixed charge rate. The fixed charge rate may be a predetermined charge rate based on the battery itself, such as a recommended charge rate provided by the manufacturer of the battery and/or the playback device, a charge rate provided by a testing or rating authority, a charge rate governed by the capacity of the hardware of the corresponding device and charger, etc. Recommended charge rates provided by a manufacturer, testing authority, etc. may be included as a part of a "recommended charge rate range" corresponding to the range of charge rates that will likely cause the least amount of performance degradation for the battery. In some cases, the media playback system can query a playback device for a recommended charge rate or recommended charge rate range. In some examples, the media playback system can query one or more remote computing devices to request a recommended charge rate or recommended charge rate range. In certain examples, the recommended charge rate or recommended charge rate range is adjusted or modified based on the age of the battery, charge cycles, etc.

Once the battery reaches the threshold, the charging scheme can cause the media playback system to adjust the charge rate to a lower charge rate or a trickle charge rate to maintain the charge level at the threshold. In some cases, the charging scheme includes a minimum charge level for a battery so that the battery is only charged if it drops below the minimum charge level. Under this charging scheme, the battery charge is set to stay below a certain threshold beyond which may be damaging to the battery and accelerate degradation of the battery. Thus, this charging scheme provides for less battery degradation as compared to conventional charging approaches. In some cases, if the predetermined percentage of charge capacity is lower than a certain threshold (e.g., 40%, 60%, etc.) the media playback system notifies one or more users that the corresponding device is only being charged to the certain threshold so that the user(s) can select a different charging scheme if, for example, the user is planning on using the playback device without a charger (i.e., while the playback device is not plugged in).

In another charging scheme, the battery of a playback device is charged based on use patterns of the playback device, such as when the playback device is used, how the playback device is used, the type of content played by the playback device, when and how often the playback device is connected to a charger, and so on. In this manner, the media playback system can anticipate the needs of a battery of a playback device and configure the battery to be charged accordingly. The media playback system can track playback device usage statistics to determine when and how a playback device is used and use that information to construct and/or select a charging scheme for the playback device. For example, a playback device may regularly be used from a start time of 6 μm to an end time of 8 pm every weekday and consume an average of 950 mAh (milliampere-hours) of the corresponding battery's electric charge during that time. In this case, the media playback system can anticipate that at 6 pm each weekday the battery of the playback device will need approximately 950 mAh so that the playback device can be used during the two-hour window. Accordingly, the media playback system can construct and employ a charging scheme that charges the battery of the playback device to, for example, the lesser of a) a predetermined percentage (e.g., 110%, 120%, 150%) of the playback device's average consumption during the usage window (i.e., 6 μm to 8 μm in this example) or b) a predetermined threshold of the battery's maximum capacity, before switching to a charge rate sufficient to maintain this target charge level (e.g., a low recommended charge rate or a trickle charge rate). In some cases, the predetermined percentage of the playback device's average consumption is determined by analyzing usage statistics (over the past week, month, year, etc.), constructing one or more distributions (e.g., normal distribution) of, for example, start times and durations, based on the usage statistics, and computing a target charge level based on the distribution parameters (e.g., mean, variance, standard deviation, etc.), such as 1.5 standard deviations above a mean consumption value (e.g., 950 mAh) for a particular start time, etc. In some cases, the media playback system uses machine learning techniques to construct, for example, a predictive model (e.g., a forecast model, time-series model, etc.) that predicts when and how long a playback device will be used, how much charge will be required by that use, and so on. Based on this information, the media playback system can construct and/or employ a charging scheme that provides sufficient charge for the predicted usage window. Moreover, the media playback system can monitor how well a predictive model performs and provide this information back to the predictive model to improve the performance of the predictive model over time. For example, the media playback system can regularly update the training set for the model with the usage information along with, for example, an indication of whether the charge provided for an anticipated usage window was insufficient, sufficient, excessive, etc. For example, if the media playback system determines that the playback device is regularly put back on a charger (e.g., plugged in) before the end of the anticipated usage window with a charge level at or close to some predetermined threshold (e.g., 0%, 5%, 15%), the media playback system can provide data to the predictive model indicating that the predicted charge level was insufficient. The predictive model can, in turn, be updated (e.g., re-trained) to reflect this new information. Under this charging scheme, the battery charge is kept relatively low, but provides enough charge for the device to be used during anticipated usage windows. Thus, this charging scheme provides for less battery degradation as compared to conventional charging approaches.

In some cases, the media playback system includes a group of devices that are configured to operate in synchronous playback of the same media content. A user who is planning to use these playback devices for an event may find that she wants to charge each device in anticipation of the event. However, each of the devices may be at a different charge level and require different amounts of time to charge using conventional charging techniques. Alternatively, the device may have the same or substantially same charge level, but one of the devices may have a battery in a substantially different battery state such that at least one device will charge at a significantly different rate than one or more of the other devices.

Under this arrangement, the media playback system can employ a charging scheme that is based on the playback devices in the group and their corresponding batteries. For example, if two or more playback devices are grouped together, the media playback system can employ a charging scheme for each that is configured to bring each playback device's battery to a target charge level by a target time. In some examples, the media playback system can query each playback device for its current battery state (e.g., current charge, current charge rate, maximum charge rate, safe or recommended charge rate range, maximum capacity, temperature, battery age, lifetime battery charge cycles, etc.) and determine how long the battery of each playback device will take to charge (e.g., reach a target charge level) at or near its highest recommended charge rate. After this is determined, the media playback system can then identify the playback device with the battery that will take the greatest amount of time to charge, determine the time at which that battery will reach its target charge level, and then employ a charging scheme for each playback device such that the battery of each playback device finishes charging (e.g., reaches a target charge level) at substantially the same time. Under this charging scheme, batteries of playback devices in the group are not charged to a target charge level at a potentially damaging charge rate just so that they can wait for the batteries of other playback devices in the group to be charged to their target charge level. Thus, this charging scheme provides for less battery degradation for the group as a whole as compared to conventional charging approaches. The media playback system may periodically poll the playback devices and update charging schemes to respond actively or dynamically to changing circumstances for playback devices in the group. In some cases, the media playback system allows a user to override a charging scheme for one or more of the playback devices to charge their batteries faster by, for example, selecting a different charging scheme, such as a charging scheme described herein or a conventional charging scheme. In this manner, batteries of playback devices that are grouped may be configured to charge according to the same or different charging schemes.

In some examples, a playback device may include a system or mechanism for harvesting or otherwise receiving energy from alternative sources, such as electromagnetic energy harvesting (e.g., solar, radio frequency (RF), induction, etc.), mechanical energy harvesting (e.g., piezoelectric, vibration, torsion, etc.) and thermodynamic energy harvesting (e.g., heat, chemical reaction, etc.), etc. In some examples, the alternative sources may include one or more wireless power sources such as one or more examples discussed above with respect to FIGS. 7 and 8. A charging scheme can take advantage of these energy harvesting systems by charging a battery to a certain threshold or target charge level (e.g., a predetermined percentage of capacity, such as 30%, 45%, 50%, 85%, etc.) and allowing the remaining capacity to be charged via an energy harvesting source (e.g., solar panel(s)), wireless charging device, etc. As discussed above, the media playback system can track usage statistics for a device, including when an alternative energy harvesting system is able to harvest energy (e.g., during the daytime for a solar panel, during a user's regular commute or exercise routine for a kinetic system, etc.) and charge the corresponding battery to a target charge level prior to the alternative energy harvesting period based on, for example, an average amount of energy the harvesting system is able to harvest during this period. Under this charging scheme, batteries of playback devices can take advantage of slower and/or safer alternative energy sources, thereby prolonging the life of the battery and reducing costs associated with charging batteries as compared to conventional charging approaches. Similarly, the media playback system can employ a charging scheme that is based on time of day or time of use electricity rates by, for example, scheduling batteries to be charged while the cost of electricity is low, as determined based on, for example, pricing schedules provided by a utility company or service.

In some cases, the media playback system extends battery life of playback devices by altering playback responsibilities of one or more of the playback devices. For example, if a battery of a playback device is running low on power (e.g., below a predetermined charge level threshold), the media playback system can determine whether any playback responsibilities of that device can be offloaded to another device, adjusted (e.g., turned off, turned down, re-configured, etc.), and so on. To reduce power consumption by a playback device, the media playback system may reduce playback of audio content that includes frequencies below a predetermined threshold frequency (e.g., 100 Hz, 300 Hz) by, for example, sending an instruction to the playback device to reduce playback of frequencies below the predetermined threshold frequency. As those of ordinary skill in the art will appreciate, frequencies associated with bass (about 250 Hz or less) and low midrange ranges (e.g., between about 250 Hz and about 500 Hz) generally consume more power to reproduce than frequencies in other ranges (e.g., greater than about 500 Hz). To conserve a battery's charge the media playback system and/or a playback device may adjust a playback device's automatic tuning feature, dynamic equalization, sampling rate for analyzing playback or sound quality, etc. As another example, a microphone associated with the playback device may be disabled or periodically toggled on and off to reduce power consumption.

As another example, a playback device may switch communication techniques from one that requires more power to one that requires less power (e.g., from WiFi to Bluetooth), etc. to prolong battery life. In some cases, the media playback system may offload these features or responsibilities (or a portion thereof) to another device (or devices), such as a playback device that is currently charging, that has a higher charge level, etc. For example, if the battery of a pair of headphones drops below a certain threshold charge level, the media playback system may transition playback from the headphones to another device and vice versa. The media playback system may alert a user prior to this transition to avoid playback from headphones transitioning to a quiet room, playback from speakers at a party transitioning to headphones, and so on. The playback device may be configured to automatically make these adjustments when its battery reaches a predetermined charge threshold. In this manner, the disclosed media playback system reduces power consumption of the playback device(s) with the least remaining charge and/or playback time, thereby extending the playback time of these playback devices and prolonging user enjoyment of the media playback system as compared to conventional approaches. In certain examples, a portable playback device may identify a corded playback device (or perhaps another battery-power device with a higher charge level) in the same zone or room or an adjacent zone or room and automatically switch playback to that device based on the portable playback device charge level.

Figure 9:
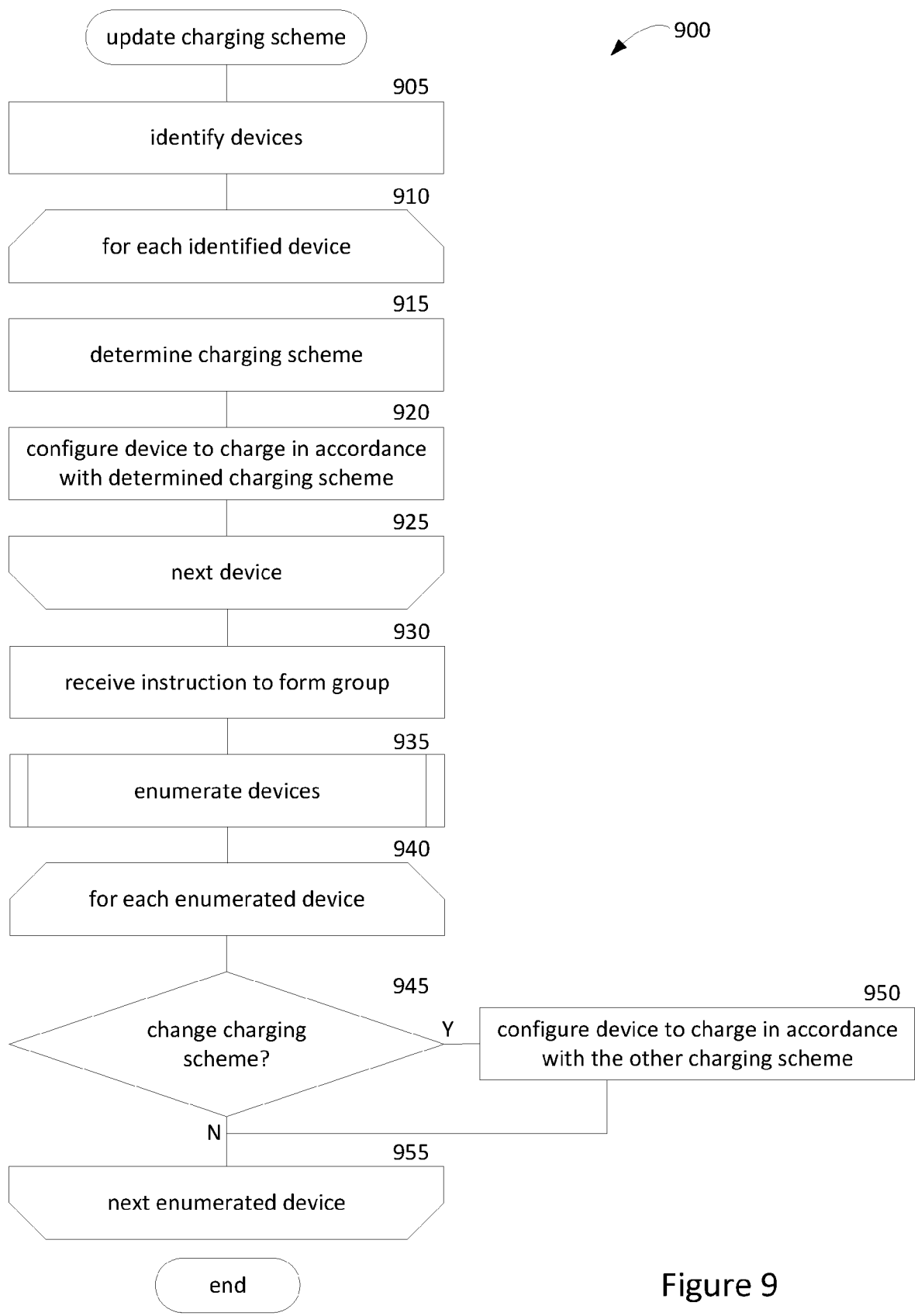
FIG. 9 illustrates an example method for updating charging schemes of one or more playback devices in accordance with the disclosed technology.
Figure 10:
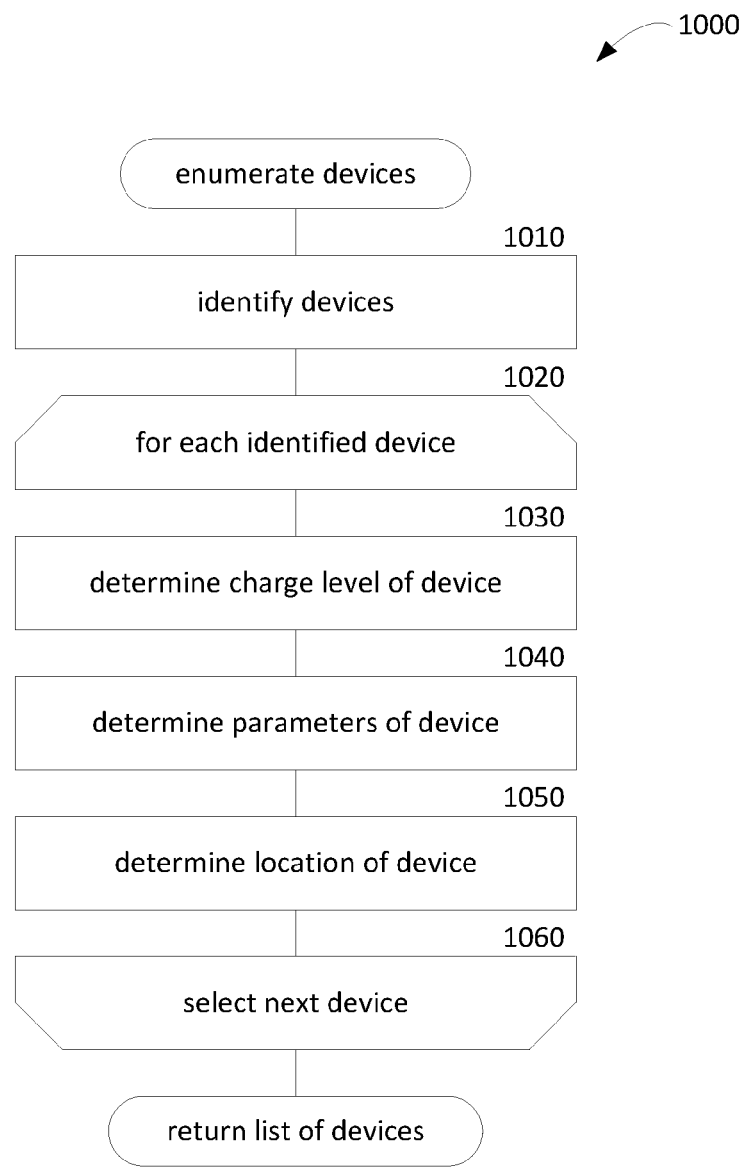
FIG. 10 illustrates an example method for enumerating devices in a media playback system in accordance with the disclosed technology.
Figure 11:
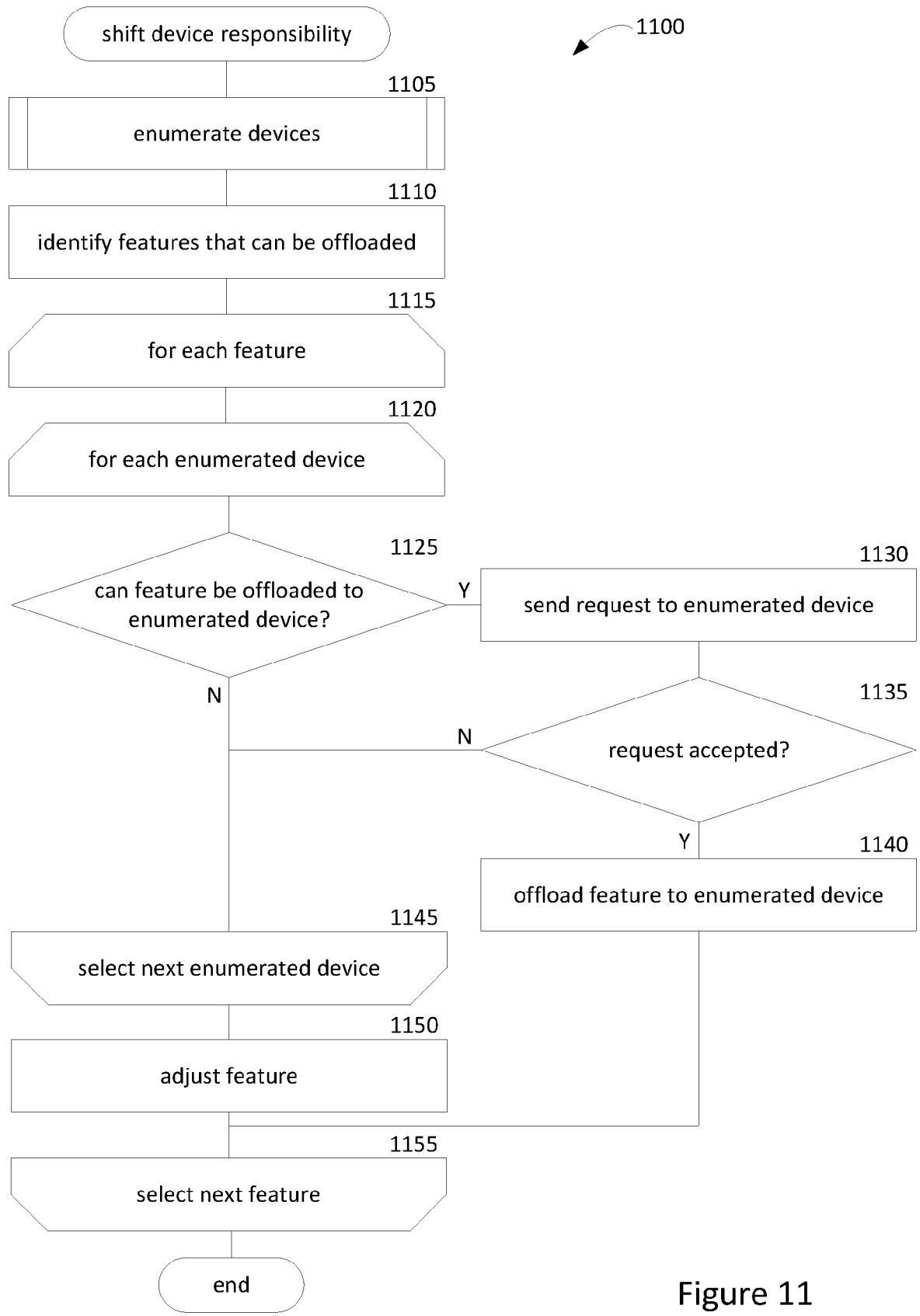
FIG. 11 illustrates an example method for shifting device responsibility in a media playback system in accordance with the disclosed technology.

FIGS. 9-11 illustrate example methods in accordance with the present technology. The methods 900, 1000, and 1100 can be implemented by any of the devices described herein, or any other devices now known or later developed. Various embodiments of the methods 900, 1000, and 1100 include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods 900, 1000, and 1100 and for other processes and methods disclosed herein, the flowcharts show functionality and operation of possible implementations of some embodiments. In this regard, each block may represent a component, a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that store data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIGS. 9-11 may represent circuitry that is wired to perform the specific logical functions in the process.

FIG. 9 illustrates an example method 900 for updating charging schemes of one or more playback devices in accordance with some embodiments of the disclosed technology. With reference to FIG. 9, the method 900 begins at block 905, which involves identifying devices. For example, the media playback system may identify devices by accessing a device roster or manifest associated with a group of playback devices. As another example, the playback system may identify playback devices that are in proximity to the media playback based on a determination that the media playback system and the playback device are communicatively coupled via a common local area network, based on a determination that they are in direct wireless communication (e.g., Bluetooth, NFC, ultra-wideband (UWB), etc.), based on a received signal strength indicator (RSSI), based on an audible chirp emitted via one device and detection via one or more microphones of another device, or any other suitable approach.

In blocks 910-925, the media playback system loops through each of the identified devices to determine an appropriate charging scheme for the device and configures the device to charge in accordance with that charging scheme. In block 915, the media playback system determines a charging scheme for the currently selected device. The charging scheme may be a conventional charging scheme, a charging scheme, such as a charging scheme described herein, selected by a user via, for example, a controller device in response to a prompt, etc. In some cases, the charging scheme can be determined automatically based on parameters of the currently selected device, usage history of the device, and so on. For example, if the charge level of the battery of the currently selected device is below one or more charge thresholds, the media playback system may select a charging scheme such that the currently selected device's battery charges at a predetermined charge rate associated with the corresponding charge threshold. As another example, a charging scheme may be selected that attempts to charge currently selected device's battery to a predetermined percentage of capacity (e.g., 55%, 80%, 90%, 95%, etc.) within a predetermined period (e.g., 30 minutes, one hour, four hours, etc.) and then charges the device at a predetermined charge rate, such as a low recommended charge rate, a trickle charge rate, etc. As another example, a charging scheme may be selected to charge the battery of the currently selected device as slowly as possible. In block 920, the media playback system configures the currently selected device to charge in accordance with the selected charging scheme by, for example, sending an indication of the selected charging scheme to the device, periodically sending charging instructions to the device in accordance with a charging schedule or itinerary associated with the charging scheme, and so on. In block 925, if there are any identified devices remaining, then the media play back system loops back to block 910 to select the next device, otherwise the media playback system continues at block 930.

In block 930, the media playback system receives an instruction to form a group of playback devices. This instruction may come from a user, from a playback device, automatically generated by the media play back system itself upon determining that two or more playback devices are in proximity (e.g., connected to the same network, in the same room, etc.), and so on. In block 935, the media playback system invokes an enumerate devices component of the media play back system, such as method 1000 described below with reference to FIG. 10, to obtain a list of devices within the group and ascertain various attributes about those devices, such as a charge level or other parameters associated with each device. In blocks 940-955, the media playback system loops through each of the enumerated devices to update each device's charging scheme where appropriate. In decision block 945, if the charging scheme of the currently selected enumerated device needs to be modified or changed, then the media playback system continues at block 950, otherwise the media playback device continues at block 955. For example, if the instruction to form the group includes a time parameter (e.g., date, time, etc.), then the media playback system may select a charging scheme for each device that brings the device to a predetermined charge level by a time specified by or determined from the time parameter. As another example, and as discussed above, the media playback system can identify the device in the group whose battery will be the last to charge (i.e., come to a predetermined charge level) and charge the batteries of each of the other devices so that each of the playback devices is charged at substantially the same time. In block 950, the media playback system configures the currently selected device to be charged in accordance with a newly selected or modified charging scheme. In block 955, if there are any enumerated devices remaining then the media playback device loops back to block 940 to select the next enumerated device, otherwise the method 900 completes. One of ordinary skill in the art will recognize that any number of events may prompt the media playback system or a device to update or modify charging schemes, such as an alert from a device that its battery charge level is below or is about to be below a certain charge threshold, a manual request from a user, a notification that a device has been added or removed from a group of devices or area, etc. Similarly, the media playback system may periodically (e.g., hourly, daily, etc.) check the condition of playback devices to determine whether any changes to their charging schemes are warranted.

FIG. 10 illustrates an example method 1000 for enumerating devices in a media playback system by identifying those devices and ascertaining various attributes of those devices in accordance with some embodiments of the disclosed technology. With reference to FIG. 10, the method 1000 begins at block 1010, which involves identifying devices. For example, the media playback system may identify devices by accessing a device roster or manifest associated with a group of playback devices. As another example, the playback system may identify playback devices that are in proximity to the media playback system. In blocks 1020-1060, the media playback system loops through each of the enumerated devices to ascertain various attributes of the enumerated device. In block 1030, the media playback system determines a charge level for the device by, for example, querying the playback device or its battery for a charge level (and/or charge capacity). In block 1040, the component determines parameters of the device, such as a recommended charge rate or range associated with the device, a list of features the device possesses (e.g., hardware features, software features, audio features, etc.), an indication of whether and/or how well the device can perform certain responsibilities during synchronized playback (e.g., broadcast audio to a room vs. headphones, bass response, communication with a controlling device, etc.), performance metrics associated with the device, and so on. In block 1050, the media playback system determines a location of the device, such as a geographic location, an indication of a room or playback zone the device is in, a proximity of the device relative to one or more other devices, and so on. In some cases, the media playback system determines a relative position (e.g., distance and direction) and/or orientation of the device using UWB and/or acoustic techniques. The location of a device can impact its playback responsibility, power requirements, etc. For example, rear satellites may require less low frequency content. Similarly, relative position and/or orientation can impact the acoustic output with respect to beamforming, speaker directivity strategy, bass cut-off strategy, and so on. In block 1060, if there are any identified devices remaining, the media playback system loops back to block 1020 to select the next device, otherwise the method 1000 returns a list of the identified devices and their corresponding attributes. In some examples, the media playback system may cache or otherwise store the list of enumerated devices (and their corresponding attributes) and only invoke the enumerate devices component if it has not been invoked during a prior predetermined period (e.g., the last five minutes, the last hour, the last day, etc.).

FIG. 11 illustrates an example method 1100 for shifting device responsibility in a media playback system from one device to another device in accordance with some embodiments of the disclosed technology. Method 1100 may be invoked by the media play back system via, for example, a playback device, a controller device, etc. in response to determining that the distinguished device is running low on power, has been disconnected from a charging source, is being disconnected from a group of synchronized devices, in response to a request from a user, etc. With reference to FIG. 11, the method 1100 begins at block 1105, which involves invoking an enumerate devices component of the media playback system, such as method 1000 described above with reference to FIG. 10, to identify devices that may be available to take over responsibilities of the distinguished device and ascertain various attributes of those identified devices. In block 1110, the media playback system identifies features (or player capabilities) of the distinguished device that can be offloaded by, for example, querying the distinguished device for a list of these features, comparing features of the distinguished device to a list of features capable of being offloaded or shifted to another device, etc. In some cases, this list is maintained by the media playback system and/or provided by device manufacturers, third parties, etc.

In blocks 1115-1155, the media playback system loops through each of the identified features (or player capabilities) of the distinguished device and attempts to adjust those features or offload responsibility for those features to another device. In blocks 1120-1145, the media playback system loops through each of the enumerated devices. In some cases, the media playback system first ranks the enumerated devices based on, for example, their charge level, their ability to perform or execute the currently selected feature (e.g., based on performance metric attributes identified via the enumerate devices component), and so on and then loops through the enumerated devices in ranked order. In decision block 1125, if the media play back system determines that the currently selected feature of the distinguished device can be offloaded to the currently selected enumerated device, the media playback system continues at block 1130, otherwise the media playback system continues at block 1145. This determination may be made, for example, by querying the currently selected enumerated device to determine whether it can perform the currently selected feature, checking the list provided by the enumerate devices component to determine whether the currently selected feature is supported by currently selected enumerated device, determining whether the synchronized playback and/or currently selected feature is location sensitive and, if so, whether the currently selected enumerated device is in a proper location to perform the currently selected feature, etc. In block 1130, the media playback system sends a request to the currently selected enumerated device to take over responsibility of the currently selected feature. In some examples, the media play back system also sends a notification to a user indicating that responsibility of the currently selected feature will be shifted from the distinguished device to the currently selected enumerated device, which the user can accept or deny. In decision block 1135, if the request (or requests) is accepted then the media playback system continues at block 1140, otherwise the media playback system continues at block 1145. In block 1140, the media playback system offloads the currently selected feature to the currently selected enumerated device by, for example, enabling the feature in the currently selected enumerated device, disabling the feature in the distinguished device, channeling any communications, messages, or signals related to the feature to the currently selected enumerated device, notifying other devices of the change in responsibility, and so on and then continues at block 1155 to select another feature. In some cases, rather than immediately offloading or transitioning responsibility, the media playback system may shift responsibility over a predetermined period (e.g., 30 seconds, five minutes, etc.). For example, the media playback system may gradually decrease the volume and/or bass output of the distinguished device while simultaneously increasing the volume and/or bass output of the currently selected enumerated device. In some cases, rather than offloading responsibility of a feature from the distinguished device to one of the enumerated devices, the media playback system may offload responsibility to multiple devices. In block 1145, if there are any enumerated devices remaining, the media playback system loops back to block 1120 to select the next enumerated device. In block 1150, because the distinguished device was unable to offload responsibility for the currently selected feature (e.g., because none of the enumerated devices were capable or accepted a request, a user denied a request, etc.), the media playback system attempts to adjust the currently selected feature by, for example, turning the feature off, turning the feature down, etc. In some cases, the media playback system may prompt a user to let the user know that the feature could not be offloaded and let the user select how to adjust the feature, if at all. In block 1155, if there are any features remaining, the media play back loops back to block 1115 to select the next feature, otherwise method 1100 completes. In some cases, the media playback system periodically analyzes the available playback devices to determine when, under current conditions, one or more batteries of the playback devices will reach a predetermined threshold level and attempts to shift device responsibility in advance of that time.

FIGS. 12A-12D illustrate examples of device charging schemes in accordance with the disclosed technology. Referring to FIGS. 12A-12D together, a first playback device 1210*a* (e.g., a portable playback device such as Sonos Roam) has first state according to a set of one or more first parameters (e.g., device parameters, playback responsibilities, environmental/contextual parameters, player capability parameters, and/or battery parameters such as current charge, current charge rate, maximum charge rate, safe or recommended charge rate range, maximum capacity, temperature, battery age, lifetime battery charge cycles, etc.). A battery of the first playback device 1210*a* receives electric power according to a first charging scheme 1280*a* from a power source (e.g., via an electrical power cord/cable plugged into an outlet, a vehicle power receptacle, power over ethernet (POE), another battery, one or more other playback devices, an energy harvester, a wireless power source, etc.) A second playback device 1210*b* has a second state according to a set of one or more second parameters and receives electric power according to a second charging scheme 1280*b* from a power source (either the same power source as the first playback device, a different power source, and/or a combination thereof). In the illustrated example of FIG. 12A, the first playback device 1210*a* and the second playback device 1210*b* may be operating in ungrouped state. Alternatively, for instance, one or both devices may be members (or coordinators) of different groups and/or bonded zones.

In some examples, a media playback system can receive an instruction (e.g., via a control device or via one of the playback devices) to form a new group or bonded zone comprising the first playback device 1210*a* and the second playback device 1210*b*, or to join an existing group or bonded zone. In some examples, the first playback device 1210*a* and the second playback device 1210*b* automatically form a new group or bonded zone (or join an existing group or bonded zone) in response to a trigger (e.g., detection of proximity of one device to the other, detection of proximity of both devices to a third device, detection of a listener, time of day, detection of multichannel audio, detection of line-in input at a display device such as a television, etc.).

Figure 12A:
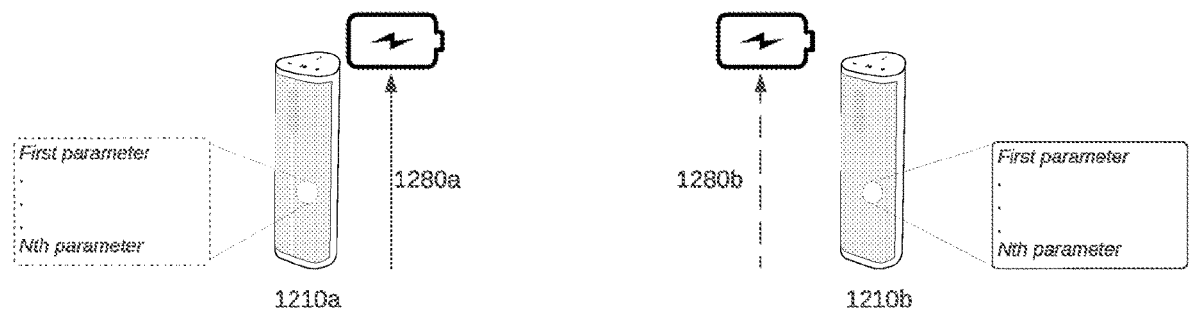
FIGS. 12A-12D illustrate examples of device charging schemes in accordance with the disclosed technology.
Figure 12B:
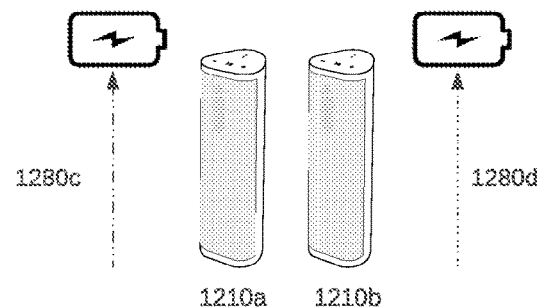
Figure 12C:
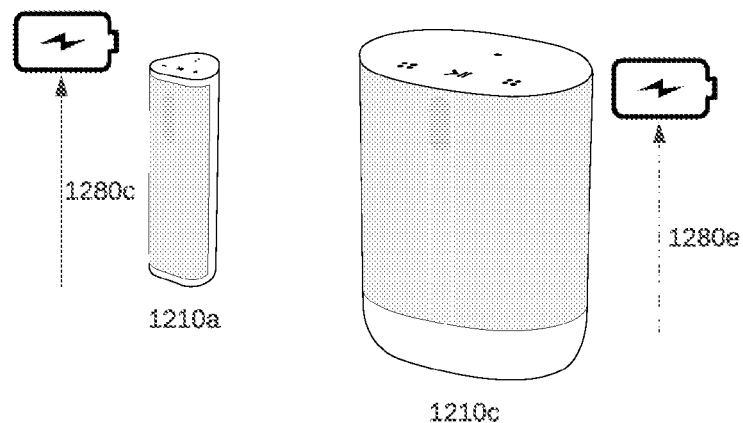

FIG. 12B illustrates the first playback device 1210*a* and the second playback device 1210*b* as part of group and/or bonded zone such that the two devices are configured to output the same media content (or individual channels of the same media content) in synchrony or substantial synchrony. FIG. 12B shows the first playback device 1210*a* is configured to charge according to a charging scheme 1280*c* and the second playback device 1210*b* configured to charge according to a charging scheme 1280*d*. In some examples, the charging schemes 1280*a* and 1280*c* are the same, and the charging schemes 1280*b* and 1280*d* are the same. In other examples, however, the charging scheme 1280*c* differs from the charging scheme 1280*a* based on one or more parameters of the first playback device 1210*a* and/or the second playback device 1210*b*.

For instance, according to charging scheme 1280*a*, the first playback device 1210*a* may charge to a first target threshold (e.g., 90%) at a first charging rate. Similarly, according to charging scheme 1280*b*, the second playback device may charge to a second target threshold (e.g., 95%) at the first charging rate or another charging rate. Upon joining the group (or bonded zone), the charging scheme 1280*c* may be adjusted to match the second target threshold. In some examples, as discussed above, the charging schemes 1280*c* and 1280*d* are updated to reflect different charge levels among the batteries of the first playback device 1210*a* and the second playback device 1210*b*. For instance, the first playback device 1210*a* may have a first charge level (e.g., 70%) and the second playback device 1210*b* may have a second charge level (e.g., 30%). In this scenario, charging according to the charging scheme 1280*c* (rather than the charging scheme 1280*a*) may comprise adjusting the rate of charging the battery of the first playback device 1210*a* at a lesser rate such that the first and second playback devices 1210*a* and 1210*b* reach their target thresholds at substantially the same time.

In some examples, the charging scheme 1280*c* is adjusted to reflect a difference in playback (or other) responsibility between the ungrouped and grouped states in either the first playback device 1210*a* or the second playback device 1210*b*. For instance, the first and second charging schemes 1280*a* and 1280*b* may have the same (or substantially the same) target charging threshold (e.g., 90%, 95%, 98%). After grouping, however, the second playback device 1210*b* may be assigned a particular playback responsibility such that the second playback device 1210*b* is predicted to consume a different amount of power than the first playback device 1210*a* while grouped or bonded, even if the devices have similar batteries with similar age. For instance, in some examples, after the devices are grouped, the second playback device 1210*b* may be assigned voice command responsibility such that its onboard voice engine is active. In these scenarios, a voice engine on the first playback device 1210*a* may be correspondingly deactivated since operating a voice engine on both devices may be redundant. Accordingly, the charging scheme 1280*c* may have a first target charge level (e.g., 70%, 80%, 90%) that differs from a second target charge level (e.g., 90%, 95%, 100%) of the charging scheme 1280*d* by an offset (e.g., 10%, 20%, 30%) indicative of a delta between power consumption on a portable device with an active voice engine (e.g., the second playback device 1210*b*) and inactive voice engine (e.g., the first playback device 1210*a*). In some examples, the first and second playback devices 1210*a* and 1210*b* may instead periodically alternate active voice engine responsibility such that a single one of the devices does not need to have an excessively high target charge level (e.g., greater than 95%, 98%, or 99%). In some examples, the charge rate of the charging scheme 1280*c* is at least partially based on the offset between the first and second target charge levels.

In some examples, one or more other parameters of either first or second playback devices 1210*a* and 1210*b* can cause adjustments to the charging schemes 1280*c* and/or 1280*d*. For instance, if when entering a grouped mode, the second playback device 1210*b* is designated as a group coordinator and the first playback device 1210*a* is designated as a group member, then the charging schemes 1280*c* and 1280*d* may be adjusted to reflect an offset between the first and second target charge levels indicative of the expected power consumption difference between a group coordinator and group member(s).

In some examples, the first playback device 1210*a* is grouped (or bonded) with a third playback device 1210*c* (FIG. 12C) with a battery that is charged according to a charging scheme 1280*c*. In some examples, the third playback device 1210*c* has a battery that has a different charge capacity than the battery of the first playback device 1210*a*. For instance, the battery of the first playback device 1210*a* may have a storage capacity (or, alternatively, a target charge level) that is a first percentage (e.g., 10%, 25%, 33%, 50%, 60, 75%, 80%, 90%, etc.) of the storage capacity of the third playback device 1210*c* (or vice versa). Since the devices are configured for grouped playback, however, the devices may be configured to play back audio while both devices have sufficient remaining battery power. Accordingly, when the devices are grouped together, the charging scheme 1280*c* can be adjusted such the target charge level of the third playback device 1210*c* is approximately the first percentage of the total storage capacity of the battery of the third playback device 1210*c*. In some examples, the charging scheme 1280*c* is updated to charge the battery of the third playback device 1210*c* based on a predictive model of power consumption such that the batteries of both devices will reach a minimum threshold charge (e.g., 0% remaining, 1% remaining, 5% remaining, 10% remaining, 15% remaining, etc.) at substantially the same time during playback. In some examples, the individual charging schemes 1280*a* and 1280*c* are also adjusted to account for differences in standby power consumption among the devices. Adjusting the charging scheme 1280*c* as described above can allow for a lesser target charge level than would be typical if the third playback device 1210*c* were ungrouped, which may beneficially result in a slower charge rate and thus potentially greater battery life. In some examples, when the devices are ungrouped, the charging scheme 1280*c* may revert to a more typical charge target level and pattern.

Figure 12D:
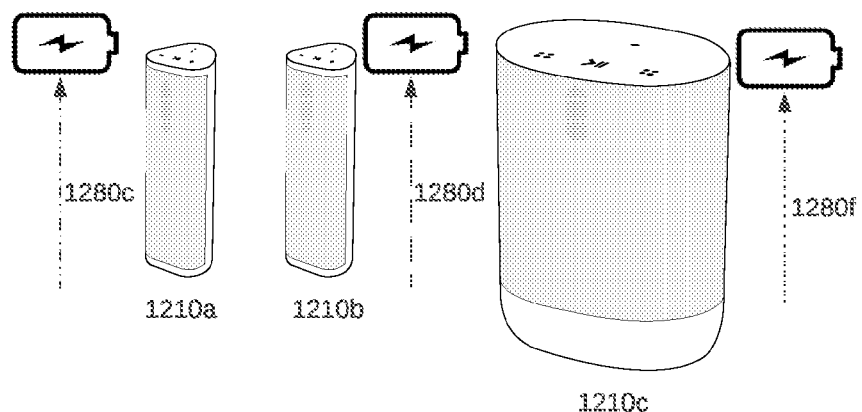

In some examples, the first playback device 1210*a* and second playback device 1210*b* are grouped with the third playback device 1210*c* (FIG. 12D). In one scenario, for instance, the battery of the third playback device 1210*c* has a storage capacity a first percentage (e.g., 20%, 30%, 50%, 75%, 90%, 100%, etc.) different than (e.g., greater) the batteries on the other devices. Accordingly, some tasks/responsibilities that typically consume non-negligible amounts of power such as voice command detection, group coordination, audio processing and calibration (e.g., Trueplay), algorithmic media content generation, etc. can be shifted to the third playback device 1210*c* to take advantage of its greater battery storage capacity. In this scenario, the charging schemes 1280*c*, 1280*d*, and 1280*f* are adjusted such that the batteries during grouped playback of all three devices are predicted to reach a predetermined minimum at substantially the same time.

In some examples, the charging scheme 1280*f* may be adjusted to compensate for the additional responsibilities. For instance, assuming all three devices had the same responsibilities, the media play back system may determine a target charge level of the first and second playback devices 1210*a* and 1210*b* to be approximately a first percentage (e.g., 95%) and a second percentage (e.g., 95%), respectively, and a target charge level of the third playback device 1210*c* to be approximately 30% (indicative of the proportion of storage capacity of the battery of the third playback device 1210*c* with respect to either of the first playback device 1210*a* or second playback device 1210*b*). The charging scheme 1280*f* can be adjusted by one or more additional offsets including, for instance, a first offset and a second offset.

In some examples, a charging scheme is adjusted by a predictive composite offset that takes into consideration one or more additional parameters other than merely a predicted power consumption amount. In some cases, "less capable" group members with less storage capacity and/or bass capability can offload low frequency content handling to a "more capable" group member(s) (or group coordinator) with a larger storage capacity and/or more bass capability. The charging scheme 1280f may thus be adjusted to account for (a) the additional power consumption by the more capable group member(s) and (b) the longer predicted battery operating time of the less capable group members (due to no longer needing to produce certain bass frequencies). In some examples, the first playback device 1210a and the second playback device 1210b offload handling of bass frequencies below a crossover frequency (e.g., 100 Hz, 125 Hz, 200 Hz, 250 Hz, 300 Hz) to the third playback device 1210c, potentially resulting in a greater predicted battery operating time (e.g., 15 min, 30 min, 45 min, 60 min, 120 min, etc.) for the first playback device 1210a and the second playback device 1210b. Accordingly, the charging scheme 1280c can be adjusted by a composite offset that accounts for several parameters including (a) the additional power consumption predicted to be needed to output the low frequencies of the other devices, and (b) the predicted additional operating time of the other devices. In this scenario, the charging scheme 1280c may have a first target charge level (e.g., 35%, 40%, 50%, 75%, 80%) that is adjusted by a predictive composite offset that comprises the additional power consumption needed plus the additional operating time(s) of the other devices (as a percentage of the total storage capacity of the battery of the third playback device 1210c). In some examples, the predictive composite offset may be affected by the media content type being played back. For instance, spoken word content (e.g., podcasts, talk radio, sports, social audio, etc.) may be expected to have significantly less low frequency content than audio associated with music and/or video content.

FIGS. 13A-13D illustrate examples of device playback sessions in accordance with the disclosed technology. Referring to FIGS. 13A-13D together, in some examples, when the remaining charge level of the battery of the first playback device 1210a (when being charged for an external power source) becomes less than a predetermined minimum threshold percentage (e.g., 1%, 5%, 10%, 15%), one or more nearby playback devices can be detected and playback session 1390a can be transitioned thereto, either automatically or via manual input. For instance, a presence of an adjacent playback device 1310a (FIG. 13A) can be detected within a threshold distance (e.g., 1 m, 3 m, 5 m, 10 m) and, accordingly, the playback session 1390a can be transitioned or "swapped" thereto from the first playback device 1210a.

In some examples, for instance, a playback device that has an on-going playback session may maintain or have access to playback session data that defines and/or identifies the playback session. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. In example implementations, the offset may be set to a playback position in the audio content of the current playback position to allow time for the target device to start buffering the audio content. Then, the source playback device stops playback of the audio content at the offset and the target playback device starts playback of the audio content at the offset. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. Additional details regarding swapping or transitioning playback sessions between playback devices can be found, for example, in U.S. Pat. No. 11,356,777, entitled "Playback Transitions," and U.S. patent application Ser. No. 16/805,182, entitled "Playback Transitions" (filed on Feb. 28, 2020), each of which is incorporated herein by reference in its entirety.

In some examples, the playback device 1310a comprises a corded, out-loud playback device. In other examples, the playback device 1310a comprises a battery-powered portable device such as a portable, out-loud playback device, a wearable device such as a pair of headphones or earphones, a smartphone, a tablet, etc. Automatically transitioning playback from the first playback device 1210a to the playback device 1310a beneficially allows audio playback to continue in the event that the battery of the first playback device 1210a is about to become fully discharged. In some examples, when the first playback device 1210a is connected to a power source and the amount of charge reaches a certain threshold percentage (e.g., 25%, 33%, 50%, 75%, 90%, 95%), the system will automatically revert playback session 1390a to the first playback device 1210a and cease playback on the playback device 1310a.

Figure 13A:
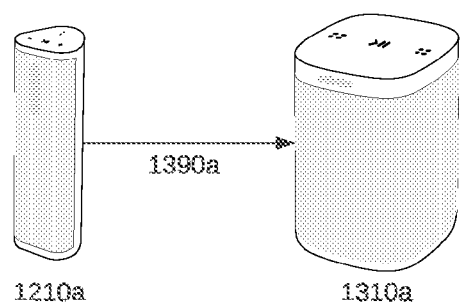
FIGS. 13A-13D illustrate examples of device playback sessions in accordance with the disclosed technology.
Figure 13B:
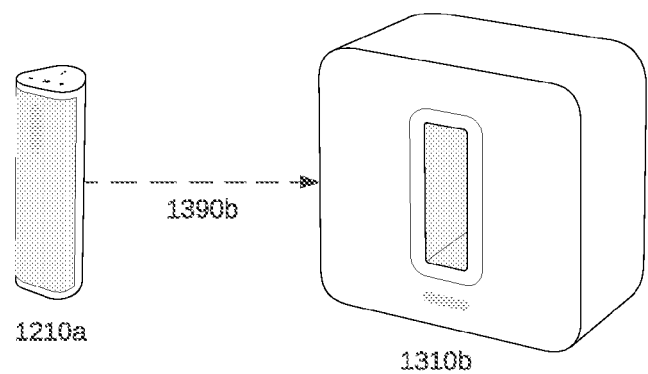
Figure 13C:
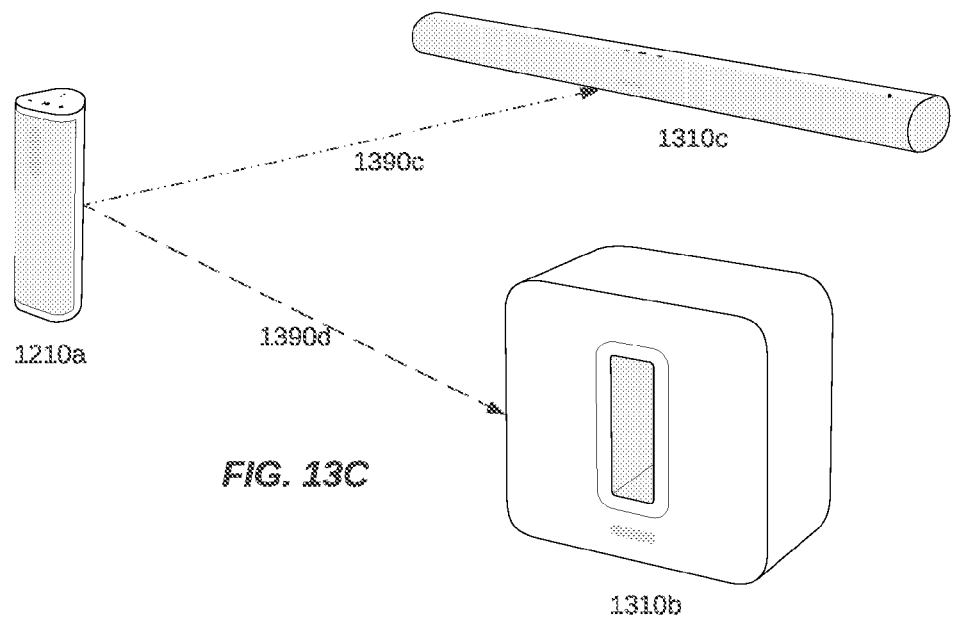

In some examples, rather than transfer an entire playback session to another device, the system can assign a first portion 1390b of the playback session of the first playback device 1390 to another playback device 1310b (e.g., a subwoofer) as shown in FIG. 13B. For instance, the first portion 1390b may comprise a portion of the frequency spectrum of the playback session less than a first crossover frequency (e.g., 100 Hz, 125 Hz, 200 Hz, 250 Hz). Assigning the first portion of the frequency spectrum to the playback device 1310b such that the first playback device 1210a plays back audio greater than the first crossover frequency can reduce the amount of power consumed during playback and therefore may prolong battery life by requiring less frequent charging and thus fewer charge cycles.

In some examples, a second portion 1390c (FIG. 13C) of the playback session of the first playback device 1210a is assigned to a playback device 1310c for playback and a third portion 1390d of the playback session is assigned to the playback device 1310b. The second portion 1390c may comprise audio greater than a second crossover frequency (e.g., 100 Hz, 125 Hz, 200 Hz, 250 Hz) different (e.g., less than) from the first crossover frequency, and the third portion 1390d may comprise audio less than the second crossover frequency. In some examples, the playback device 1310c comprises an out-loud device (e.g., a soundbar, an all-in-one player, etc.) that has greater bass capability than the first playback device 1210a, and that may be connected to wall power (or have a greater amount of remaining battery charge than the first playback device 1210a). In this scenario, with more bass capability and greater ability to consume power (relative to the first playback device 1210a), a crossover frequency lower than the first crossover frequency may be selected. In some examples, the first playback device 1210a continues to receive audio from an audio source via, for instance, a Bluetooth or another IEEE 802.15 compatible protocol, a physical line-in, etc. and transmit the audio to the playback devices 1310b and 1310c (and/or other devices) without playing back audio itself (or while playing back audio), even if the first playback device 1210a is connected to a power source or has a significant amount of charge remaining (e.g., greater than 50%). Assigning the second and third portions 1390*c* and 1390*d* of the playback session to the corded devices even while being charged may minimize the charge rate needed to charge the first playback device 1210*a*, therefore potentially prolonging its battery life.

Figure 13D:
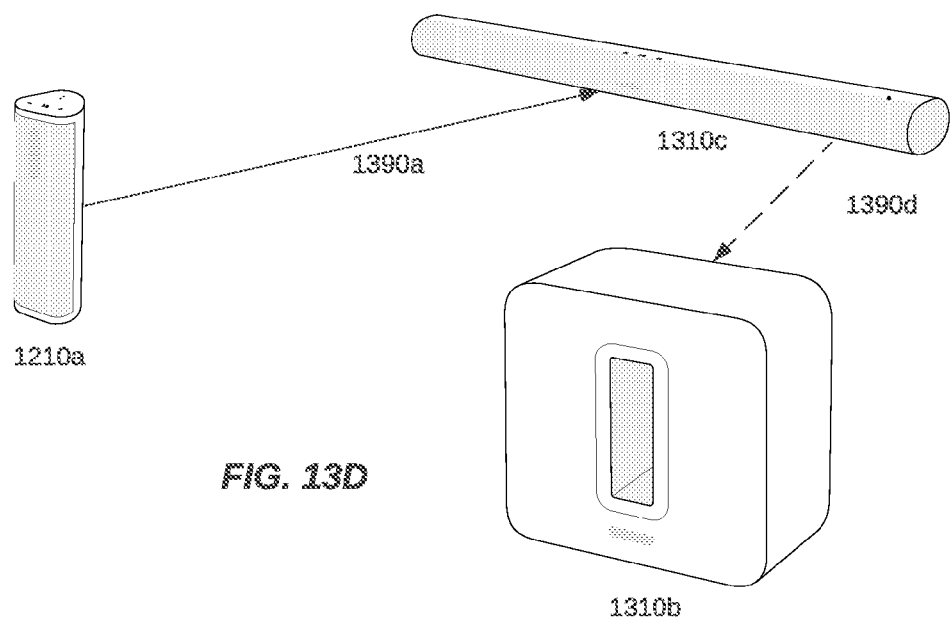

In some examples, rather than assigning the second and third portions 1390*c* and 1390*d* to individual devices, the full playback session 1390*a* is assigned to one or more other devices, such as the playback device 1310*c*, which delegates the third portion 1390*d* (or another portion) of the playback session to the playback device 1310*b* (FIG. 13D). In some examples, the playback device 1310*c* comprises a wearable device.

Figure 14A:
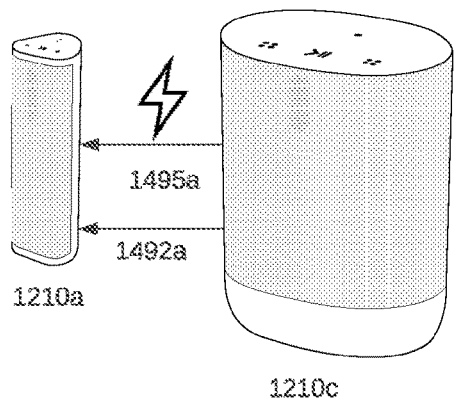
FIGS. 14A-14C illustrate examples of device charging schemes and/or media data transmission in accordance with the disclosed technology.
Figure 14B:
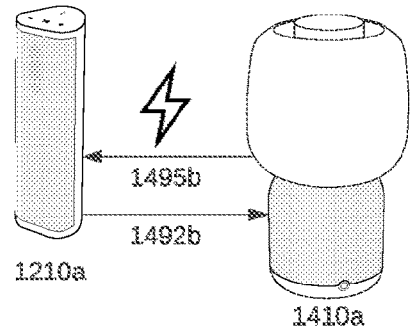
Figure 14C:
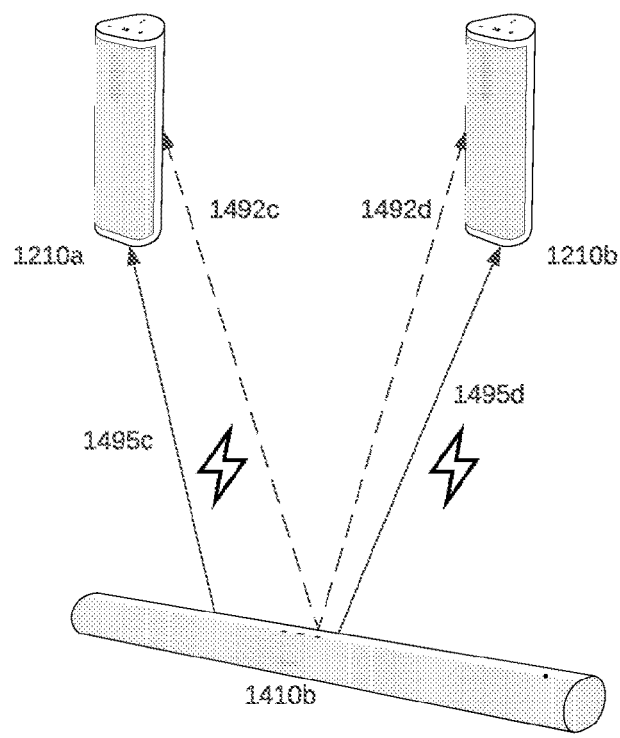

FIGS. 14A-14C illustrate examples of device charging schemes and/or audio data transmission/relaying in accordance with the disclosed technology. Referring to FIGS. 14A-14C together, in some examples, the first playback device 1210*a* can receive power from one or more other devices via a power transmission link while also transmitting and/or receiving audio data from the corresponding device(s). The power transmission link comprises one or more wires (e.g., thin wires), cables (e.g., power cables, data transmission cables such as ethernet cable, USB cables, etc.), and/or wireless transmission modalities such as those described above with respect to FIGS. 7 and 8.

In some examples, a playback device can receive audio data (or other data, such as video data, control data, timing information, etc.) that is relayed via another playback device and concurrently receive power from the other playback device. FIG. 14A, for instance, illustrates one example in which the first playback device 1210*a* may receive audio data 1492*a* and power via a power transmission link 1495*a* from the third playback device 1210*c*. The playback device 1210*c* may be configured to relay the audio data 1492*a* via a transmission path (e.g., Bluetooth Low Energy (BLE) or another similar low-energy personal area network (PAN)) requiring less power at the first playback device 1210*a* compared to conventional transmission paths (e.g., via WiFi over a local area network (LAN)). Accordingly, the charging scheme of the first playback device 1210*a* may be adjusted to alter one or more parameters (e.g., charge rate, target charge level, etc.), resulting in a lower charge rate and therefore potentially prolonging battery life.

In some examples, a single playback device may relay audio data and transmit power to several other playback devices. FIG. 14C, for instance, illustrates one example in which a playback device 1410*b* relays audio data 1492*c* (e.g., a left rear surround channel) and audio data 1492*d* (e.g., a right rear surround channel) to the first and second playback devices 1210*a* and 1210*b*, respectively. The playback device 1410*b* also transmits power to the first and second playback devices 1210*a* and 1210*b* via power transmission links 1495*c* and 1495*d*, respectively. In some examples, the power transmission links 1495*c* and 1495*d* are substantially the same power transmission type (e.g., wireless power transfer, one or more cables, etc.). In other examples, the power transmission links 1495*c* and 1495*d* are different types. In certain examples, the first playback device 1210*a* receives power from the playback device 1410*b* while the second playback device 1210*b* receives power from another source (e.g., wall outlet, another device, energy harvesting, etc.). In some examples, the charging schemes of the first and second playback devices 1210*a* and 1210*b* are adjusted based on the bonded zone type (e.g., stereo pair, home theater multichannel audio such as 5.1, 5.x, 7.1.2, 7.2.4, 9.2.4, 9.4.6, etc.), audio data content, power transmission type, and/or one or more other parameters discussed above.

In some examples, a playback device may receive power via a power transmission link from another device while concurrently sending audio data to the other device. FIG. 14B, for instance, illustrates an example in which the playback device 1210*a* receives power via a power transmission link 1495*b* (e.g., one or more wires, cables, wireless power transfer modalities) from a device 1410*a* while concurrently sending data 1492*b* to the device 1410*a* for playback. In the illustrated example of FIG. 14B, the device 1410*b* comprises a light source. In some examples, the device 1410*a* comprises a playback device with or without transducers. In some examples, the device 1410*a* comprises one or more displays. In some examples, the device 1410*a* comprises one or more IoT devices or household appliances. In some examples, the device 1410*a* is a component device of and/or integrated in a vehicle (e.g., an automobile, a boat, a bus, an airplane). In some examples, at least one of the first playback device 1210*a* and/or the device 1410*a* comprises a wearable device. In operation, the first playback device 1210*a* receives data 1492*b* (such as audio content, video content, gaming content, extended reality (e.g., virtual, augmented, and/or mixed reality) content, timing information, control data, and/or other suitable data described above) and transmits the data 1492*b* to the device 1410*a*. The device 1410*a* may play back the data 1492*b* while also providing power to the first playback device 1210*a*. In some examples, for instance, the first playback device 1210*a* sends the data 1492*b* to the device 1410*a* (e.g., one or more playback devices) for play back rather being played back by the first playback device 1210*a* in order to reduce power consumption at the first playback device 1210*a*. In some examples, a decision whether to receive power via the power transmission link 1495*b* and/or transmit the data 1492*b* can be based on the charging scheme of the first playback device 1210*a*. For instance, in some examples, if the current charge level of the battery of the first playback device 1210*a* is about a certain percentage (e.g., 40%, 50%, 60%, 75%, 90%), the first playback device 1210*a* may cease receiving power by the power transmission link 1495*b* and/or relaying the data 1492*b*. In some examples, the charging scheme is adjusted based on a detected distance between the first playback device 1210*a* and the device 1410*a*.

In the illustrated examples described above, the devices may be shown as audio playback devices. In some examples, however, one or more of the devices may comprise other types of devices including smartphones, tablets, video display devices (e.g., televisions), internet of things (IoT) devices such as sensors, cameras, microphones, thermostats, light sources, smart doorbells, etc.

VI. Conclusion

The above discussions relating to wireless power transfer devices, playback devices, controller devices, playback zone configurations, and media/audio content sources provide only some examples of operating environments within which functions and methods described below may be implemented. Other operating environments and configurations of wireless power transfer systems, media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1: A media playback system comprising: a first playback device comprising a first power storage; a second playback device comprising a second power storage; one or more computer-readable media having instructions stored thereon that, when executed by one or more processors of the media playback system, cause the media playback system to perform operations comprising: receiving power from a first power source to charge the first power storage according to a first charging scheme; receiving power from a second power source to charge the second power storage according to a second charging scheme; receiving an instruction to form a group for synchronous audio playback comprising at least the first playback device and the second playback device; obtaining one or more power parameters associated with the first playback device and/or the second playback device; after receiving the instruction to form the group, modifying the first charging scheme based on the one or more power parameters; and receiving power from the first power source to charge the first power storage according to the modified first charging scheme.

Example 2: The media playback system of any one of the Examples herein, wherein the power parameters comprise one or more of: a power level of the first power storage; a power level of the second power storage; an age of the first power storage; an age of the second power storage; a temperature of the first power storage; a temperature of the second power storage; a power charging rate of the first charging scheme; a power charging rate of the second charging scheme; a playback responsibility of the first playback device; a playback responsibility of the second playback device; a player capability parameter of the first playback device; a player capability parameter of the second playback device; or a time parameter.

Example 3: The media playback system of any one of the Examples herein, wherein modifying the first charging scheme comprises modifying a target charge level for the first power storage to a charge level lower than a maximum charge capacity of the first power storage.

Example 4: The media playback system of any one of the Examples herein, wherein the first playback device comprises one or more energy harvesters, and wherein the one or more power parameters comprise an indication of power receipt via the one or more energy harvesters.

Example 5: The media playback system of any one of the Examples herein, wherein the operations further comprise: modifying the first charging scheme and/or the second charging scheme such that the playback device having a lower power storage level charges at a faster rate than the playback device having a higher power storage level.

Example 6: The media playback system of any one of the Examples herein, wherein the operations further comprise modifying the first charging scheme and/or the second charging scheme such that the first power storage and the second power storage reach a threshold charge level at substantially the same time.

Example 7: The media playback system of any one of the Examples herein, wherein the operations further comprise: synchronously playing back audio content via the first playback device and the second playback device; and based on the one or more power parameters, modifying playback to reduce an amount of audio content having frequencies less than a predetermined threshold frequency that is played back via at least the first playback device.

Example 8: The media playback system of any one of the Examples herein, further comprising a third playback device, wherein the operations further comprise synchronously playing back at least a portion of the audio content having frequencies less than the predetermined threshold frequency via a third playback device.

Example 9: The media playback system of any one of the Examples herein, wherein the operations further comprise: receiving an instruction to ungroup the first playback device and the second playback device; reverting, based on the received instruction to ungroup the first playback device and the second playback device, the modified first charging scheme to the first charging scheme; and receiving, after reverting the modified first charging scheme to the first charging scheme, power from the first power source to charge the first power storage according to the first charging scheme.

Example 10: The media playback system of any one of the Examples herein, wherein the first playback device comprises a first network interface, and wherein obtaining the one or more power parameters comprises receiving, via the first network interface, data corresponding to the one or more power parameters associated with the second playback device.

Example 11: The media playback system of any one of the Examples herein, wherein the second playback device comprises a second network interface, and wherein obtaining the one or more power parameters comprises transmitting, via the first network interface, data corresponding to the one or more power parameters associated with the second playback device.

Example 12: The media playback system of any one of the Examples herein, wherein obtaining the one or more power parameters comprises receiving, via the first network interface from a computing device, the data corresponding to the one or more power parameters associated with the second playback device.

Example 13: The media playback system of any one of the Examples herein, wherein obtaining the one or more power parameters comprises receiving, via the first network interface from the second power source, the data corresponding to the one or more power parameters associated with the second playback device.

Example 14: The media playback system of any of the Examples herein, wherein the first power source is the same as the second power source.

Example 15: The media playback system of any of the Examples herein, wherein the first power source is different from the second power source.

Example 16: A method comprising: receiving power from a first power source to charge a first power storage of a first playback device according to a first charging scheme; receiving power from a second power source to charge a second power storage of a second playback device according to a second charging scheme; receiving an instruction to form a group for synchronous audio playback comprising at least the first playback device and the second playback device; obtaining one or more power parameters associated with the first playback device and/or the second playback device; after receiving the instruction to form the group, modifying the first charging scheme based on the one or more power parameters; and receiving power from the first power source to charge the first power storage according to the modified first charging scheme.

Example 17: The method of any one of the Examples herein, wherein the power parameters comprise one or more of: a power level of the first power storage; a power level of the second power storage; an age of the first power storage; an age of the second power storage; a temperature of the first power storage; a temperature of the second power storage; a power charging rate of the first charging scheme; a power charging rate of the second charging scheme; a playback responsibility of the first playback device; a playback responsibility of the second playback device; a player capability parameter of the first playback device; a player capability parameter of the second playback device; or a time parameter.

Example 18: The method of any one of the Examples herein, wherein modifying the first charging scheme comprises modifying a target charge level for the first power storage to a charge level lower than a maximum charge capacity of the first power storage.

Example 19: The method of any one of the Examples herein, wherein the first playback device comprises one or more energy harvesters, and wherein the one or more power parameters comprise an indication of power receipt via the one or more energy harvesters.

Example 20: The method of any one of the Examples herein, wherein the operations further comprise: modifying the first charging scheme and/or the second charging scheme such that the playback device having a lower power storage level charges at a faster rate than the playback device having a higher power storage level.

Example 21: The method of any one of the Examples herein, wherein the operations further comprise modifying the first charging scheme and/or the second charging scheme such that the first power storage and the second power storage reach a threshold charge level at substantially the same time.

Example 22: The method of any one of the Examples herein, wherein the operations further comprise: synchronously playing back audio content via the first playback device and the second playback device; and based on the one or more power parameters, modifying playback to reduce an amount of audio content having frequencies less than a predetermined threshold frequency that is played back via at least the first playback device.

Example 23: The method of any one of the Examples herein, further comprising synchronously playing back at least a portion of the audio content having frequencies less than the predetermined threshold frequency via a third playback device.

Example 24: The method of any one of the Examples herein, further comprising: receiving an instruction to ungroup the first playback device and the second playback device; reverting, based on the received instruction to ungroup the first playback device and the second playback device, the modified first charging scheme to the first charging scheme; and receiving, after reverting the modified first charging scheme to the first charging scheme, power from the first power source to charge the first power storage according to the first charging scheme.

Example 25: The method of any one of the Examples herein, wherein the first playback device comprises a first network interface, and wherein obtaining the one or more power parameters comprises receiving, via the first network interface, data corresponding to the one or more power parameters associated with the second playback device.

Example 26: The method of any one of the Examples herein, wherein the second playback device comprises a second network interface, and wherein obtaining the one or more power parameters comprises transmitting, via the first network interface, data corresponding to the one or more power parameters associated with the second playback device.

Example 27: The method of any one of the Examples herein, wherein obtaining the one or more power parameters comprises receiving, via the first network interface from a computing device, the data corresponding to the one or more power parameters associated with the second playback device.

Example 28: The method of any one of the Examples herein, wherein obtaining the one or more power parameters comprises receiving, via the first network interface from the second power source, the data corresponding to the one or more power parameters associated with the second playback device.

Example 29: The method of any one of the Examples herein, wherein the first power source is the same as the second power source.

Example 30: The method of any one of the Examples herein, wherein the first power source is different from the second power source.

Example 31: One or more tangible, non-transitory computer-readable media storing instructions that, when executed by one or more processors of a media playback system, cause the media playback system to perform operations comprising: receiving power from a first power source to charge the first power storage according to a first charging scheme; receiving power from a second power source to charge the second power storage according to a second charging scheme; receiving an instruction to form a group for synchronous audio playback comprising at least the first playback device and the second playback device; obtaining one or more power parameters associated with the first playback device and/or the second playback device; after receiving the instruction to form the group, modifying the first charging scheme based on the one or more power parameters; and receiving power from the first power source to charge the first power storage according to the modified first charging scheme.

Example 32: The computer-readable media of any one of the Examples herein, wherein the power parameters comprise one or more of: a power level of the first power storage; a power level of the second power storage; an age of the first power storage; an age of the second power storage; a temperature of the first power storage; a temperature of the second power storage; a power charging rate of the first charging scheme; a power charging rate of the second charging scheme; a playback responsibility of the first playback device; a playback responsibility of the second playback device; a player capability parameter of the first play back device; a player capability parameter of the second playback device; or a time parameter.

Example 33: The computer-readable media of any one of the Examples herein, wherein modifying the first charging scheme comprises modifying a target charge level for the first power storage to a charge level lower than a maximum charge capacity of the first power storage.

Example 34: The computer-readable media of any one of the Examples herein, wherein the first playback device comprises one or more energy harvesters, and wherein the one or more power parameters comprise an indication of power receipt via the one or more energy harvesters.

Example 35: The computer-readable media of any one of the Examples herein, wherein the operations further comprise: modifying the first charging scheme and/or the second charging scheme such that the playback device having a lower power storage level charges at a faster rate than the playback device having a higher power storage level.

Example 36: The computer-readable media of any one of the Examples herein, wherein the operations further comprise modifying the first charging scheme and/or the second charging scheme such that the first power storage and the second power storage reach a threshold charge level at substantially the same time.

Example 37: The computer-readable media of any one of the Examples herein, wherein the operations further comprise: synchronously playing back audio content via the first playback device and the second playback device; and based on the one or more power parameters, modifying playback to reduce an amount of audio content having frequencies less than a predetermined threshold frequency that is played back via at least the first playback device.

Example 38: The computer-readable media of any one of the Examples herein, wherein the operations further comprise synchronously playing back at least a portion of the audio content having frequencies less than the predetermined threshold frequency via a third playback device.

Example 39: The computer-readable media of any one of the Examples herein, wherein the operations further comprise: receiving an instruction to ungroup the first playback device and the second playback device; reverting, based on the received instruction to ungroup the first playback device and the second playback device, the modified first charging scheme to the first charging scheme; and receiving, after reverting the modified first charging scheme to the first charging scheme, power from the first power source to charge the first power storage according to the first charging scheme.

Example 40: The computer-readable media of any one of the Examples herein, wherein the first playback device comprises a first network interface, and wherein obtaining the one or more power parameters comprises receiving, via the first network interface, data corresponding to the one or more power parameters associated with the second playback device.

Example 41: The computer-readable media of any one of the Examples herein, wherein the second playback device comprises a second network interface, and wherein obtaining the one or more power parameters comprises transmitting, via the first network interface, data corresponding to the one or more power parameters associated with the second playback device.

Example 42: The computer-readable media of any one of the Examples herein, wherein obtaining the one or more power parameters comprises receiving, via the first network interface from a computing device, the data corresponding to the one or more power parameters associated with the second playback device.

Example 43: The computer-readable media of any one of the Examples herein, wherein obtaining the one or more power parameters comprises receiving, via the first network interface from the second power source, the data corresponding to the one or more power parameters associated with the second playback device.

Example 44: The computer-readable media of any one of the Examples herein, wherein the first power source is the same as the second power source.

Example 45: The computer-readable media of any one of the Examples herein, wherein the first power source is different from the second power source.

Example 46: A method comprising obtaining one or more power parameters associated with at least one of a first playback device that is receiving power to charge a first power storage of the first playback device according to a first charging scheme, and a second playback device that is receiving power to charge a second power storage of the second playback device according to a second charging scheme, and modifying at least the first charging scheme based on the one or more power parameters, and causing the first playback device to receive power to charge the first power storage of the first playback device according to the modified first charging scheme.

Example 47: The method of Example 46, further comprising receiving an instruction to form a group for synchronous audio playback comprising at least the first playback device and the second playback device, after receiving the instruction to form the group, causing the first playback device to receive power based on the modified first charging scheme.

Example 48: The method of any one of the Examples herein, wherein the power parameters comprise one or more of a power level of the first power storage, a power level of the second power storage, an age of the first power storage, an age of the second power storage, a temperature of the first power storage, a temperature of the second power storage, a power charging rate of the first charging scheme, a power charging rate of the second charging scheme, a playback responsibility of the first playback device, a playback responsibility of the second playback device, a player capability parameter of the first playback device, a player capability parameter of the second playback device, or a time parameter.

Example 49: The method of any one of the Examples herein, wherein modifying the first charging scheme comprises modifying a target charge level for the first power storage to a charge level lower than a maximum charge capacity of the first power storage.

Example 50: The method of any one of the Examples herein, wherein the first playback device comprises one or more energy harvesters, and wherein the one or more power parameters comprise an indication of power receipt via the one or more energy harvesters.

Example 51: The method of any one of the Examples herein, further comprising modifying the first charging scheme and/or the second charging scheme such that the play back device having a lower power storage level charges at a faster rate than the playback device having a higher power storage level.

Example 52: The method of any one of the Examples herein, further comprising modifying the first charging scheme and/or the second charging scheme such that the first power storage and the second power storage reach a threshold charge level at substantially the same time.

Example 53: The method of any one of the Examples herein, further comprising synchronously playing back audio content via the first playback device and the second playback device, and based on the one or more power parameters, modifying playback to reduce an amount of audio content having frequencies less than a predetermined threshold frequency that is played back via at least the first playback device.

Example 54: The method of any one of the Examples herein, further comprising synchronously playing back at least a portion of the audio content having frequencies less than the predetermined threshold frequency via a third playback device.

Example 55: The method of any one of the Examples herein, further comprising receiving an instruction to ungroup the first playback device and the second playback device, reverting, based on the received instruction to ungroup the first playback device and the second playback device, the modified first charging scheme to the first charging scheme, and causing, after reverting the modified first charging scheme to the first charging scheme, the first power storage to receive power according to the first charging scheme.

Example 56: The method of any one of the Examples herein, wherein the first playback device comprises a first network interface, and wherein obtaining the one or more power parameters comprises receiving, via the first network interface, data corresponding to the one or more power parameters associated with the second playback device.

Example 57: The method of any one of the Examples herein, wherein the second playback device comprises a second network interface, and wherein obtaining the one or more power parameters comprises transmitting, via the first network interface, data corresponding to the one or more power parameters associated with the second playback device.

Example 58: The method of any one of the Examples herein, wherein obtaining the one or more power parameters comprises receiving, via the first network interface from a computing device, the data corresponding to the one or more power parameters associated with the second playback device.

Example 59: The method of any one of the Examples herein, wherein the first power storage receives power from a first power source, and wherein the second power storage receives power from a second power source.

Example 60: The method of any one of the Examples herein, wherein obtaining the one or more power parameters comprises receiving, via the first network interface from the second power source, the data corresponding to the one or more power parameters associated with the second playback device.

Example 61: The method of any one of the Examples herein, wherein the first power source is the same as the second power source.

Example 62: The method of any one of the Examples herein, wherein the first power source is different from the second power source.

Example 63: The method of any one of the Examples herein, wherein causing the power storage to receive power comprises causing the power storage to receive power via wireless power charging.

Example 64: The method of any one of the Examples herein, wherein modifying at least the first charging scheme comprises modifying at least the first charging scheme based on at least one of usage history, and a predictive model trained to predict a required charge level.

Example 65: A media playback system comprising, a first playback device comprising a first power storage, a second playback device comprising a second power storage, and one or more computer-readable media having instructions stored thereon that, when executed by one or more processors of the media playback system, cause the media playback system to perform the method of any one of the Examples herein.

Example 66: One or more tangible, non-transitory computer-readable media storing instructions that, when executed by one or more processors of a media playback system, cause the at least one device of the media playback system to perform the method of any one of the Examples herein.

The invention claimed is:

1. A media playback system comprising:
a first playback device comprising a first power storage;
a second playback device comprising a second power storage;
one or more computer-readable media having instructions stored thereon that, when executed by one or more processors of the media playback system, cause the media playback system to perform operations comprising:
receiving power from a first power source to charge the first power storage according to a first charging scheme;
receiving power from a second power source to charge the second power storage according to a second charging scheme;
receiving an instruction to form a group for synchronous audio playback comprising at least the first playback device and the second playback device;
obtaining one or more power parameters associated with the first playback device and/or the second playback device;

after receiving the instruction to form the group, modifying the first charging scheme based on the one or more power parameters; and
receiving power from the first power source to charge the first power storage according to the modified first charging scheme.

2. The media playback system of claim 1, wherein the power parameters comprise one or more of:
a power level of the first power storage;
a power level of the second power storage;
an age of the first power storage;
an age of the second power storage;
a temperature of the first power storage;
a temperature of the second power storage;
a power charging rate of the first charging scheme;
a power charging rate of the second charging scheme;
a playback responsibility of the first playback device;
a playback responsibility of the second playback device;
a player capability parameter of the first playback device;
a player capability parameter of the second playback device; or
a time parameter.

3. The media playback system of claim 1, wherein modifying the first charging scheme comprises modifying a target charge level for the first power storage to a charge level lower than a maximum charge capacity of the first power storage.

4. The media playback system of claim 1, wherein the first playback device comprises one or more energy harvesters, and wherein the one or more power parameters comprise an indication of power receipt via the one or more energy harvesters.

5. The media playback system of claim 1, wherein the operations further comprise: modifying the first charging scheme and/or the second charging scheme such that the play back device having a lower power storage level charges at a faster rate than the playback device having a higher power storage level.

6. The media playback system of claim 1, wherein the operations further comprise modifying the first charging scheme and/or the second charging scheme such that the first power storage and the second power storage reach a threshold charge level at substantially the same time.

7. The media playback system of claim 1, wherein the first power source is the same as the second power source.

8. The media playback system of claim 1, wherein the first power source is different from the second power source.

9. The media playback system of claim 1, wherein the operations further comprise:
receiving an instruction to ungroup the first playback device and the second playback device;
reverting, based on the received instruction to ungroup the first play back device and the second playback device, the modified first charging scheme to the first charging scheme; and
receiving, after reverting the modified first charging scheme to the first charging scheme, power from the first power source to charge the first power storage according to the first charging scheme.

10. The media playback system of claim 1, wherein the operations further comprise:
synchronously playing back audio content via the first playback device and the second playback device; and
based on the one or more power parameters, modifying playback to reduce an amount of audio content having frequencies less than a predetermined threshold frequency that is played back via at least the first playback device.

11. The media playback system of claim 10, further comprising a third playback device, wherein the operations further comprise synchronously playing back at least a portion of the audio content having frequencies less than the predetermined threshold frequency via a third playback device.

12. The media playback system of claim 1, wherein the first playback device comprises a first network interface, and wherein obtaining the one or more power parameters comprises receiving, via the first network interface, data corresponding to the one or more power parameters associated with the second playback device.

13. The media playback system of claim 12, wherein the second playback device comprises a second network interface, and wherein obtaining the one or more power parameters comprises transmitting, via the first network interface, data corresponding to the one or more power parameters associated with the second playback device.

14. The media playback system of claim 12, wherein obtaining the one or more power parameters comprises receiving, via the first network interface from a computing device, the data corresponding to the one or more power parameters associated with the second playback device.

15. The media playback system of claim 12, wherein obtaining the one or more power parameters comprises receiving, via the first network interface from the second power source, the data corresponding to the one or more power parameters associated with the second playback device.

16. A method comprising:
receiving power from a first power source to charge a first power storage of a first playback device according to a first charging scheme;
receiving power from a second power source to charge a second power storage of a second playback device according to a second charging scheme;
receiving an instruction to form a group for synchronous audio playback comprising at least the first playback device and the second playback device;
obtaining one or more power parameters associated with the first playback device and/or the second playback device;
after receiving the instruction to form the group, modifying the first charging scheme based on the one or more power parameters; and
receiving power from the first power source to charge the first power storage according to the modified first charging scheme.

17. The method of claim 16, wherein the power parameters comprise one or more of:
a power level of the first power storage;
a power level of the second power storage;
an age of the first power storage;
an age of the second power storage;
a temperature of the first power storage;
a temperature of the second power storage;
a power charging rate of the first charging scheme;
a power charging rate of the second charging scheme;
a playback responsibility of the first playback device;
a playback responsibility of the second playback device;
a player capability parameter of the first playback device;
a player capability parameter of the second playback device; or
a time parameter.

18. The method of claim 16, wherein modifying the first charging scheme comprises modifying a target charge level for the first power storage to a charge level lower than a maximum charge capacity of the first power storage.

19. The method of claim 16, wherein the first playback device comprises one or more energy harvesters, and wherein the one or more power parameters comprise an indication of power receipt via the one or more energy harvesters.

20. The method of claim 16, further comprising:
modifying the first charging scheme and/or the second charging scheme such that the playback device having a lower power storage level charges at a faster rate than the playback device having a higher power storage level.

21. The method of claim 16, further comprising:
modifying the first charging scheme and/or the second charging scheme such that the first power storage and the second power storage reach a threshold charge level at substantially the same time.

22. The method claim 16, wherein the first power source is the same as the second power source.

23. The method claim 16, wherein the first power source is different from the second power source.

24. The method of claim 16, further comprising:
receiving an instruction to ungroup the first playback device and the second playback device;
reverting, based on the received instruction to ungroup the first playback device and the second playback device, the modified first charging scheme to the first charging scheme; and
receiving, after reverting the modified first charging scheme to the first charging scheme, power from the first power source to charge the first power storage according to the first charging scheme.

25. The method of claim 16, further comprising:
synchronously playing back audio content via the first playback device and the second playback device; and
based on the one or more power parameters, modifying playback to reduce an amount of audio content having frequencies less than a predetermined threshold frequency that is played back via at least the first playback device.

26. The method of claim 25, further comprising synchronously playing back at least a portion of the audio content having frequencies less than the predetermined threshold frequency via a third playback device.

27. The method of claim 16, wherein the first playback device comprises a first network interface, and wherein obtaining the one or more power parameters comprises receiving, via the first network interface, data corresponding to the one or more power parameters associated with the second playback device.

28. The method of claim 27, wherein the second playback device comprises a second network interface, and wherein obtaining the one or more power parameters comprises transmitting, via the first network interface, data corresponding to the one or more power parameters associated with the second playback device.

29. The method of claim 27, wherein obtaining the one or more power parameters comprises receiving, via the first network interface from a computing device, the data corresponding to the one or more power parameters associated with the second playback device.

30. The method of claim 27, wherein obtaining the one or more power parameters comprises receiving, via the first network interface from the second power source, the data corresponding to the one or more power parameters associated with the second playback device.

31. One or more tangible, non-transitory computer-readable media storing instructions that, when executed by one or more processors of a media playback system, cause the media playback system to perform operations comprising:
receiving power from a first power source to charge a first power storage according to a first charging scheme;
receiving power from a second power source to charge a second power storage according to a second charging scheme;
receiving an instruction to form a group for synchronous audio playback comprising at least a first playback device and a second playback device;
obtaining one or more power parameters associated with the first playback device and/or the second playback device;
after receiving the instruction to form the group, modifying the first charging scheme based on the one or more power parameters; and
receiving power from the first power source to charge the first power storage according to the modified first charging scheme.

32. The one or more tangible, non-transitory computer-readable media of claim 31, wherein the power parameters comprise one or more of:
a power level of the first power storage;
a power level of the second power storage;
an age of the first power storage;
an age of the second power storage;
a temperature of the first power storage;
a temperature of the second power storage;
a power charging rate of the first charging scheme;
a power charging rate of the second charging scheme;
a playback responsibility of the first playback device;
a playback responsibility of the second playback device;
a player capability parameter of the first playback device;
a player capability parameter of the second playback device; or
a time parameter.

33. The one or more tangible, non-transitory computer-readable media of claim 31, wherein modifying the first charging scheme comprises modifying a target charge level for the first power storage to a charge level lower than a maximum charge capacity of the first power storage.

34. The one or more tangible, non-transitory computer-readable media of claim 31, wherein the first playback device comprises one or more energy harvesters, and wherein the one or more power parameters comprise an indication of power receipt via the one or more energy harvesters.

35. The one or more tangible, non-transitory computer-readable media of claim 31, wherein the operations further comprise: modifying the first charging scheme and/or the second charging scheme such that the playback device having a lower power storage level charges at a faster rate than the playback device having a higher power storage level.

36. The one or more tangible, non-transitory computer-readable media of claim 31, wherein the operations further comprise modifying the first charging scheme and/or the second charging scheme such that the first power storage and the second power storage reach a threshold charge level at substantially the same time.

37. The one or more tangible, non-transitory computer-readable media of claim 31, wherein the first power source is the same as the second power source.

38. The one or more tangible, non-transitory computer-readable media of claim 31, wherein the first power source is different from the second power source.

39. The one or more tangible, non-transitory computer-readable media of claim 31, wherein the operations further comprise:
   receiving an instruction to ungroup the first playback device and the second play back device;
   reverting, based on the received instruction to ungroup the first playback device and the second playback device, the modified first charging scheme to the first charging scheme; and
   receiving, after reverting the modified first charging scheme to the first charging scheme, power from the first power source to charge the first power storage according to the first charging scheme.

40. The one or more tangible, non-transitory computer-readable media of claim 31, wherein the operations further comprise:
   synchronously playing back audio content via the first playback device and the second playback device; and
   based on the one or more power parameters, modifying playback to reduce an amount of audio content having frequencies less than a predetermined threshold frequency that is played back via at least the first playback device.

41. The one or more tangible, non-transitory computer-readable media of claim 40, wherein the operations further comprise synchronously playing back at least a portion of the audio content having frequencies less than the predetermined threshold frequency via a third playback device.

42. The one or more tangible, non-transitory computer-readable media of claim 31, wherein the first playback device comprises a first network interface, and wherein obtaining the one or more power parameters comprises receiving, via the first network interface, data corresponding to the one or more power parameters associated with the second playback device.

43. The one or more tangible, non-transitory computer-readable media of claim 42, wherein the second playback device comprises a second network interface, and wherein obtaining the one or more power parameters comprises transmitting, via the first network interface, data corresponding to the one or more power parameters associated with the second playback device.

44. The one or more tangible, non-transitory computer-readable media of claim 42, wherein obtaining the one or more power parameters comprises receiving, via the first network interface from a computing device, the data corresponding to the one or more power parameters associated with the second playback device.

45. The one or more tangible, non-transitory computer-readable media of claim 42, wherein obtaining the one or more power parameters comprises receiving, via the first network interface from the second power source, the data corresponding to the one or more power parameters associated with the second playback device.

* * * * *

UNITED STATES PATENT AND TRADEMARK OFFICE
CERTIFICATE OF CORRECTION

PATENT NO. : 12,489,302 B2
APPLICATION NO. : 18/876876
DATED : December 2, 2025
INVENTOR(S) : Riemer et al.

Page 1 of 1

It is certified that error appears in the above-identified patent and that said Letters Patent is hereby corrected as shown below:

On the Title Page

Item (72), in Column 1, in "Inventors", Line 1, delete "Cayon," and insert -- Canyon, --, therefor.

In the Claims

In Column 57, in Claim 5, Line 38, delete "play back" and insert -- playback --, therefor.

In Column 57, in Claim 9, Line 55, delete "first play back" and insert -- first playback --, therefor.

In Column 59, in Claim 22, Line 21, delete "claim" and insert -- of claim --, therefor.

In Column 59, in Claim 23, Line 23, delete "claim" and insert -- of claim --, therefor.

In Column 61, in Claim 39, Line 8, delete "play back" and insert -- playback --, therefor.

Signed and Sealed this
Sixth Day of January, 2026

John A. Squires
*Director of the United States Patent and Trademark Office*